US012133290B2

(12) United States Patent
Zhu et al.

(10) Patent No.: US 12,133,290 B2
(45) Date of Patent: Oct. 29, 2024

(54) UE CAPABILITY INFORMATION REPORTING METHOD AND DEVICE

(71) Applicant: Huawei Technologies Co., Ltd., Shenzhen (CN)

(72) Inventors: Peng Zhu, Shanghai (CN); Qian Zhang, Beijing (CN); Hengshu Xu, Shanghai (CN); Sicong Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 333 days.

(21) Appl. No.: 17/651,082

(22) Filed: Feb. 15, 2022

(65) Prior Publication Data

US 2022/0174476 A1    Jun. 2, 2022

Related U.S. Application Data

(63) Continuation of application No. PCT/CN2019/104463, filed on Sep. 4, 2019.

(30) Foreign Application Priority Data

Aug. 15, 2019 (WO) ................ PCT/CN2019/100876

(51) Int. Cl.
*H04W 4/00* (2018.01)
*H04W 8/24* (2009.01)
*H04W 88/06* (2009.01)

(52) U.S. Cl.
CPC .............. *H04W 8/24* (2013.01); *H04W 88/06* (2013.01)

(58) Field of Classification Search
CPC ......... H04W 8/24; H04W 88/06; H04W 8/22; H04W 72/21; H04W 76/11; H04W 76/15;
(Continued)

(56) References Cited

U.S. PATENT DOCUMENTS

| 11,357,052 | B2 * | 6/2022 | Siomina | .................... H04L 5/00 |
| 2017/0374607 | A1 * | 12/2017 | Wu | ........................ H04W 28/18 |
| 2018/0041981 | A1 | 2/2018 | Wu | |
| 2018/0092085 | A1 * | 3/2018 | Shaheen | ............... H04W 36/14 |

(Continued)

FOREIGN PATENT DOCUMENTS

| CN | 105830493 A | 8/2016 |
| CN | 108391322 A | 8/2018 |

(Continued)

OTHER PUBLICATIONS

3GPP TS 38.101-1 V15.6.0 (Jun. 2019), 3rd Generation Partnership Project; Technical Specification Group Radio Access Network; NR; User Equipment (UE) radio transmission and reception; Part 1: Range Standalone (Release 15), 229 Pages.

(Continued)

*Primary Examiner* — Stephen M D Agosta
(74) *Attorney, Agent, or Firm* — Slater Matsil, LLP

(57) ABSTRACT

Embodiments of this application relate to the field of communication technologies, and provide a user equipment UE capability information reporting method and a device. The method includes: UE receives UE capability enquiry information from a network device, where the UE capability enquiry information is used to query a capability of the UE. The UE sends UE capability information to the network device based on the UE capability enquiry information, where the UE capability information is used to indicate that the UE supports a first-type band combination, and the first-type band combination includes a band combination including an intra-band ENDC band combination and NRCA. The UE capability information includes first information and second information, the first information includes a first bandwidth combination set of the intra-band ENDC supported by the UE, and the second information includes a second bandwidth combination set of the NRCA supported by the UE.

16 Claims, 6 Drawing Sheets

(58) Field of Classification Search
CPC ..... H04L 5/0041; H04L 5/0044; H04L 5/008; H04L 5/001
See application file for complete search history.

(56) References Cited

U.S. PATENT DOCUMENTS

| | | | | |
|---|---|---|---|---|
| 2018/0146444 | A1* | 5/2018 | Chen | H04W 52/146 |
| 2018/0206113 | A1* | 7/2018 | He | H04W 8/24 |
| 2018/0219652 | A1* | 8/2018 | Chen | H04W 88/023 |
| 2018/0220295 | A1* | 8/2018 | Takahashi | H04W 72/20 |
| 2019/0342890 | A1* | 11/2019 | Tong | H04W 76/27 |
| 2022/0132354 | A1* | 4/2022 | Zhu | H04W 8/24 |
| 2022/0338188 | A1* | 10/2022 | Jain | H04W 72/56 |
| 2023/0180121 | A1* | 6/2023 | Sheik | H04W 48/20 370/329 |
| 2024/0049007 | A1* | 2/2024 | Zhang | H04W 24/02 |

FOREIGN PATENT DOCUMENTS

| | | |
|---|---|---|
| CN | 109792738 A | 5/2019 |
| JP | 2019092046 A | 6/2019 |
| WO | 2017027057 A1 | 2/2017 |

OTHER PUBLICATIONS

3GPP TS 38.101-2 V15.6.0 (Jun. 2019), 3rd Generation Partnership Project; Technical Specification Group Radio Access Network; NR; User Equipment (UE) radio transmission and reception; Part 2: Range 2 Standalone (Release 15), 141 Pages.

3GPP TS 38.101-3 V15.6.0 (Jun. 2019), 3rd Generation Partnership Project; Technical Specification Group Radio Access Network; NR; User Equipment (UE) radio transmission and reception; Part 3:Range 1 and Range 2 Interworking operation with other radios (Release 15), 171 Pages.

3GPP TS 38.306 V15.6.0 (Jun. 2019), 3rd Generation Partnership Project; Technical Specification Group Radio Access Network; NR; User Equipment (UE) radio access capabilities (Release 15), 53 Pages.

3GPP TS 38.331 V15.6.0 (Jun. 2019), 3rd Generation Partnership Project; Technical Specification Group Radio Access Network; NR; Radio Resource Control (RRC) protocol specification (Release 15), 519 Pages.

Alcatel-Lucent et al., "PRACH for LC-MTC", 3GPP TSG RAN WG1 Meeting #80bis, R1-151234, Belgrade, Serbia, Apr. 10-24, 2015, 4 pages.

ZTE et al., "WF on NB-RS for NB-Iot", 3GPP TSG RAN WG1 #84 meeting, R1-161234, St. Julian, Malta, Feb. 15-19, 2016, 3 pages.

Nokia et al., "CA BW Class", 3GPP TSG-RAN WG4 Meeting #86, R4-1802111, Athens, Greece, Feb. 26-Mar. 2, 2018, 7 pages.

ZTE Corporation, "Considerations on NR CA & EN DC notation", 3GPP TSG-RAN WG4 Meeting#86bis, R4-1803750, Melbourne, AU, Apr. 16-20, 2018, 3 pages.

Intel Corporation, "Views on RAN4 NR UE feature list", 3GPP TSG-RAN WG4 Meeting #87, R4-1806297, Busan, Korea, May 21-25, 2018, 12 pages.

T_Mobile USA, "Corrections for Intraband contiguous EN_DC to align with RAN2 signalling capabilities", 3GPP TSG-4 Meeting #88bis, R4-1812477, Oct. 8-12, 2018, 3 Pages, Chengdu, China.

* cited by examiner

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 1 | 0 |

FIG. 4

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | 0 | 0 | 1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 5

UE CAPABILITY INFORMATION REPORTING METHOD AND DEVICE

CROSS-REFERENCE TO RELATED APPLICATIONS

This application is a continuation of International Application No. PCT/CN2019/104463, filed on Sep. 4, 2019, which claims priority to International Patent Application No. PCT/CN2019/100876, filed on Aug. 15, 2019. The disclosures of the aforementioned applications are hereby incorporated by reference in their entireties.

TECHNICAL FIELD

Embodiments of this application relate to the field of communication technologies, and in particular, to a user equipment (UE) capability information reporting method and a device.

BACKGROUND

In a control plane signaling procedure of a 5th generation (5G) mobile communication technology, after an initial connection is established between UE and a network device, the network device may query a capability of the UE by using the following signaling procedure: The network device sends UE capability enquiry information to the UE, where the UE capability enquiry information is used to query the capability of the UE; after receiving the UE capability enquiry information, the UE reports the capability of the UE to the network device via UE capability information.

The capability of the UE may include at least a multi-radio access technology dual connectivity capability of the UE. For example, if the UE supports two radio access technologies: an evolved universal terrestrial radio access (EUTRA) and new radio (NR), the multi-RAT dual connectivity capability of the UE may include an EUTRA-NR hybrid networking capability. The multi-RAT dual connectivity capability of the UE may include at least a bandwidth combination set (BCS) of a band combination supported by the UE. The BCS may include one or more band combinations, each band combination may include one or more carriers, and each carrier is corresponding to one or more bandwidths. When the multi-RAT dual connectivity capability of the UE includes the EUTRA-NR hybrid networking capability, based on radio access technology types of carriers included in the band combination, the band combination may be classified into a plurality of types of band combinations, such as an NR carrier aggregation (CA) band combination, an intra-band EUTRA-NR dual connectivity (ENDC) band combination, and an inter-band ENDC band combination.

In a conventional technology, the UE reports the BCS of the band combination supported by the UE to the network device by using an information element supportedBandwidthCombinationSet and an information element supportedBandwidthCombinationSetEutra. For example, the UE reports a BCS of the NRCA band combination, a BCS of the NR component in the inter-band-ENDC band combination, or a BCS of the intra-band-ENDC band combination to the network device by using the information element supportedBandwidthCombinationSet. For another example, the UE reports a BCS of the EUTRA component in the inter-band-ENDC band combination to the network device by using the information element supportedBandwidthCombinationSetEutra.

However, as user requirements increase (where for example, user requirements on a bandwidth continuously increase) or an operator needs to deploy a network, in addition to existing types of band combination such as the NRCA band combination, the intra-band-ENDC band combination, and the inter-band-ENDC band combination, a new type of band combination, for example, a band combination including an intra-band-ENDC band combination and NRCA, may occur. Currently, if the UE supports the new type of band combination, the UE cannot report, by using the existing information element supportedBandwidthCombinationSet and/or the existing information element supportedBandwidthCombinationSetEutra, a BCS of the NRCA corresponding to the new type of band combination supported by the UE.

SUMMARY

Embodiments of this application provide a UE capability information reporting method and a device, to resolve a problem that if UE supports a band combination including an intra-band-ENDC band combination and NRCA, the UE cannot report a bandwidth combination set of the NRCA corresponding to the band combination.

To achieve the foregoing objective, the following technical solutions are used in the embodiments of this application.

According to a first aspect, an embodiment of this application provides a UE capability information reporting method. The method includes: UE receives UE capability enquiry information from a network device, where the UE capability enquiry information is used to query a capability of the UE. The UE sends UE capability information to the network device based on the UE capability enquiry information, where the UE capability information is used to indicate that the UE supports a first-type band combination, and the first-type band combination includes a band combination including an intra-band evolved universal terrestrial radio access-new radio dual connectivity ENDC band combination and new radio carrier aggregation NRCA. The UE capability information includes first information and second information, the first information includes a first bandwidth combination set of the intra-band ENDC supported by the UE, and the second information includes a second bandwidth combination set of the NRCA supported by the UE.

According to the technical solution provided in the first aspect, the UE receives the UE capability enquiry information from the network device, and reports the bandwidth combination sets of the first-type band combination supported by the UE to the network device based on the UE capability enquiry information and by using the first information and the second information included in the UE capability information, so that the network device allocates resources to the UE based on the bandwidth combination sets of the first-type band combination supported by the UE.

In a possible implementation, the first information further includes the first-type band combination supported by the UE, the first-type band combination includes n band combinations supported by the UE, and the first bandwidth combination set is all bandwidth combination sets of the intra-band ENDC corresponding to the n band combinations; and the second bandwidth combination set is all bandwidth combination sets of the NRCA corresponding to the n band combinations. Based on the foregoing technical solution, the UE may report, to the network device by using the first information, all the bandwidth combination sets of the intra-band ENDC corresponding to the n band combinations included in the first-type band combination. The UE may report, to the network device by using the second information, all the bandwidth combination sets of the NRCA corresponding to the n band combinations included in the first-type band combination. In this way, the network device allocates resources to the UE based on all the intra-band ENDC bandwidth combination sets and all the NRCA bandwidth combination sets corresponding to the n band combinations included in the first-type band combination supported by the UE.

In a possible implementation, the second information includes m bits, and the m bits are corresponding to m different bandwidth combination sets. An $i^{th}$ bit in the m bits is used to indicate whether the UE supports a bandwidth combination set corresponding to the $i^{th}$ bit, the bandwidth combination set is predefined, i is an integer greater than or equal to 0 and less than or equal to m, and m is an integer greater than or equal to 1. Based on the foregoing technical solution, the UE may indicate, by using the m bits included in the second information, the second bandwidth combination set of NRCA supported by the UE, so that the network device allocates resources to the UE based on the bandwidth combination sets of the first-type band combination supported by the UE.

In a possible implementation, the first information further includes a band list, and/or an NRCA parameter, and/or an evolved universal terrestrial radio access carrier aggregation EUTRA CA parameter that are/is supported by the UE. Based on the foregoing technical solution, the UE may report a band supported by the UE, and/or an NRCA capability of the UE, and/or an EUTRA CA capability of the UE to the network device by using the band list, and/or the NRCA parameter, and/or the EUTRA CA parameter that are/is supported by the UE and included in the first information, so that the network device allocates resources to the UE based on the bandwidth combination sets of the first-type band combination supported by the UE.

In a possible implementation, the second information further includes the first-type band combination supported by the UE, the first-type band combination includes n band combinations supported by the UE, and the second bandwidth combination set is all bandwidth combination sets of the NRCA corresponding to the n band combinations; and the first bandwidth combination set is all bandwidth combination sets of intra-band ENDC corresponding to the n band combinations. Based on the foregoing technical solution, the UE may report, to the network device by using the first information, all the bandwidth combination sets of the intra-band ENDC corresponding to the n band combinations included in the first-type band combination. The UE may report, to the network device by using the second information, all the bandwidth combination sets of the NRCA corresponding to the n band combinations included in the first-type band combination. In this way, the network device allocates resources to the UE based on all the intra-band ENDC bandwidth combination sets and all the NRCA bandwidth combination sets corresponding to the n band combinations included in the first-type band combination supported by the UE.

In a possible implementation, the first information includes m bits, and the m bits are corresponding to m different bandwidth combination sets. An $i^{th}$ bit in the m bits is used to indicate whether the UE supports a bandwidth combination set corresponding to the $i^{th}$ bit, the bandwidth combination set is predefined, i is an integer greater than or equal to 0 and less than or equal to m, and m is an integer greater than or equal to 1. Based on the foregoing technical solution, the UE may indicate, by using the m bits included in the first information, the first bandwidth combination set of intra-band ENDC supported by the UE, so that the network device allocates resources to the UE based on the bandwidth combination sets of the first-type band combination supported by the UE.

In a possible implementation, the second information further includes a band list, and/or an NRCA parameter, and/or an evolved universal terrestrial radio access carrier aggregation EUTRA CA parameter that are/is supported by the UE. Based on the foregoing technical solution, the UE may report a band supported by the UE, and/or an NRCA capability of the UE, and/or an EUTRA CA capability of the UE to the network device by using the band list, and/or the NRCA parameter, and/or the EUTRA CA parameter that are/is supported by the UE and included in the second information, so that the network device allocates resources to the UE based on the bandwidth combination sets of the first-type band combination supported by the UE.

According to a second aspect, an embodiment of this application provides a UE capability information reporting method. The method includes: A network device sends UE capability enquiry information to UE, where the UE capability enquiry information is used to query a capability of the UE. The network device receives UE capability information from the UE, where the UE capability information is used to indicate that the UE supports a first-type band combination, and the first-type band combination includes a band combination including an intra-band evolved universal terrestrial radio access-new radio dual connectivity ENDC band combination and new radio carrier aggregation NRCA. The UE capability information includes first information and second information, the first information includes a first bandwidth combination set of the intra-band ENDC supported by the UE, and the second information includes a second bandwidth combination set of the NRCA supported by the UE.

According to the technical solution provided in the second aspect, the network device sends the UE capability enquiry information to the UE, and receives the UE capability information from the UE, where the UE capability information includes the first information and the second information. The first information includes the first bandwidth combination set of the intra-band ENDC supported by the UE, and the second information includes the second bandwidth combination set of the NRCA supported by the UE. Subsequently, the network device may allocate resources to the UE based on the first bandwidth combination set and the second bandwidth combination set.

In a possible implementation, the first information further includes the first-type band combination supported by the UE, the first-type band combination includes n band combinations supported by the UE, and the first bandwidth combination set is all bandwidth combination sets of the intra-band ENDC corresponding to the n band combinations; and the second bandwidth combination set is all bandwidth combination sets of the NRCA corresponding to the n band combinations. Based on the foregoing technical solution, the network device may receive, by using the first information, all the bandwidth combination sets that are reported by the UE and of the intra-band ENDC corresponding to the n band combinations included in the first-type band combination. The network device may receive, by using the second information, all the bandwidth combination sets that are reported by the UE and of the NRCA corresponding to the n band combinations included in the first-type band combination. Subsequently, the network device may allocate resources to the UE based on all the intra-band ENDC bandwidth combination sets and all the NRCA bandwidth combination sets corresponding to the n band combinations included in the first-type band combination supported by the UE.

In a possible implementation, the second information includes m bits, and the m bits are corresponding to m different bandwidth combination sets. An $i^{th}$ bit in the m bits is used to indicate whether the UE supports a bandwidth combination set corresponding to the $i^{th}$ bit, the bandwidth combination set is predefined, i is an integer greater than or equal to 0 and less than or equal to m, and m is an integer greater than or equal to 1. Based on the foregoing technical solution, the network device may receive, by using the m bits included in the second information, the second bandwidth combination set that is of the NRCA supported by the UE and reported by the UE. Subsequently, the network device may allocate resources to the UE based on the bandwidth combination sets of the first-type band combination supported by the UE.

In a possible implementation, the first information further includes a band list, and/or an NRCA parameter, and/or an evolved universal terrestrial radio access carrier aggregation EUTRA CA parameter that are/is supported by the UE. Based on the foregoing technical solution, the network device may receive, by using the band list, and/or the NRCA parameter, and/or the EUTRA CA parameter that are/is supported by the UE and included in the first information, a supported band of the UE, and/or an NRCA capability of the UE, and/or an EUTRA CA capability of the UE that are/is reported by the UE. Subsequently, the network device may allocate resources to the UE based on the bandwidth combination sets of the first-type band combination supported by the UE.

In a possible implementation, the second information further includes the first-type band combination supported by the UE, the first-type band combination includes n band combinations supported by the UE, and the second bandwidth combination set is all bandwidth combination sets of the NRCA corresponding to the n band combinations; and the first bandwidth combination set is all bandwidth combination sets of the intra-band ENDC corresponding to the n band combinations. Based on the foregoing technical solution, the network device may receive, by using the first information, all the bandwidth combination sets that are reported by the UE and of the intra-band ENDC corresponding to the n band combinations included in the first-type band combination. The network device may receive, by using the second information, all the bandwidth combination sets that are reported by the UE and of the NRCA corresponding to the n band combinations included in the first-type band combination. Subsequently, the network device may allocate resources to the UE based on all the intra-band ENDC bandwidth combination sets and all the NRCA bandwidth combination sets corresponding to the n band combinations included in the first-type band combination supported by the UE.

In a possible implementation, in a fifth possible implementation, the first information includes m bits, and the m bits are corresponding to m different bandwidth combination sets. An $i^{th}$ bit in the m bits is used to indicate whether the UE supports a bandwidth combination set corresponding to the $i^{th}$ bit, the bandwidth combination set is predefined, i is an integer greater than or equal to 0 and less than or equal to m, and m is an integer greater than or equal to 1. Based on the foregoing technical solution, the network device may receive, by using the m bits included in the first information, the first bandwidth combination set that is of the intra-band ENDC supported by the UE and reported by the UE. Subsequently, the network device may allocate resources to the UE based on the bandwidth combination sets of the first-type band combination supported by the UE.

In a possible implementation, the second information further includes a band list, and/or an NRCA parameter, and/or an evolved universal terrestrial radio access carrier aggregation EUTRA CA parameter that are/is supported by the UE. Based on the foregoing technical solution, the network device may receive, by using the band list, and/or the NRCA parameter, and/or the EUTRA CA parameter that are/is supported by the UE and included in the second information, a supported band of the UE, and/or an NRCA capability of the UE, and/or an EUTRA CA capability of the UE that are/is reported by the UE. Subsequently, the network device may allocate resources to the UE based on the bandwidth combination sets of the first-type band combination supported by the UE.

In a possible implementation, the method further includes: The network device allocates a resource to the UE based on the UE capability information. Based on the foregoing technical solution, the network device may allocate the resource to the UE based on the bandwidth combination set of the first-type band combination that is supported by the UE and included in the UE capability information.

According to a third aspect, an embodiment of this application provides UE. The UE has a function of implementing the method according to the first aspect. The function may be implemented by hardware, or may be implemented by hardware executing corresponding software. The hardware or software includes one or more modules corresponding to the foregoing function.

According to a fourth aspect, an embodiment of this application provides a network device. The network device has a function of implementing the method according to the second aspect. The function may be implemented by hardware, or may be implemented by hardware executing corresponding software. The hardware or software includes one or more modules corresponding to the foregoing function.

According to a fifth aspect, an embodiment of this application provides a communication apparatus, including at least one processor, at least one memory, and a communication interface. The communication interface, the at least one memory, and the at least one processor are coupled. The communication apparatus communicates with another device by using the communication interface. The at least one memory is configured to store a computer program, so that when the computer program is executed by the at least one processor, the UE capability information reporting method according to the first aspect and the possible implementations of the first aspect is implemented.

According to a sixth aspect, an embodiment of this application provides a communication apparatus, including at least one processor, at least one memory, and a communication interface. The communication interface, the at least one memory, and the at least one processor are coupled. The communication apparatus communicates with another device by using the communication interface. The at least one memory is configured to store a computer program, so that when the computer program is executed by the at least one processor, the UE capability information reporting method according to the second aspect and the possible implementations of the second aspect is implemented.

According to a seventh aspect, this application provides a system chip. The system chip may be used in a communication apparatus. The system chip includes at least one processor. Related program instructions are executed by the at least one processor, to implement a function of the UE in the method according to any one of the first aspect and the designs of the first aspect. Optionally, the system chip may further include at least one memory. The memory stores the related program instructions.

According to an eighth aspect, this application provides a system chip. The system chip may be used in a communication apparatus. The system chip includes at least one processor. Related program instructions are executed by the at least one processor, to implement a function of the network device in the method according to any one of the second aspect and the designs of the second aspect. Optionally, the system chip may further include at least one memory. The memory stores the related program instructions.

According to a ninth aspect, an embodiment of this application provides a computer-readable storage medium, for example, a non-transient readable storage medium of a computer. The computer-readable storage medium stores a computer program. When the computer program is run on a computer, the computer is enabled to perform any possible method in the first aspect. For example, the computer may be at least one storage node.

According to a tenth aspect, an embodiment of this application provides a computer-readable storage medium, for example, a non-transient readable storage medium of a computer. The computer-readable storage medium stores a computer program. When the computer program is run on a computer, the computer is enabled to perform any possible method in the second aspect. For example, the computer may be at least one storage node.

According to an eleventh aspect, an embodiment of this application provides a computer program product. When the computer program product is run on a computer, the method provided in any one of the possible implementations of the first aspect is performed. For example, the computer may be at least one storage node.

According to a twelfth aspect, an embodiment of this application provides a computer program product. When the computer program product is run on a computer, the method provided in any one of the possible implementations of the second aspect is performed. For example, the computer may be at least one storage node.

According to a thirteenth aspect, an embodiment of this application provides a communication system. The communication system may include any one or more of the following: the UE in the third aspect, the network device in the fourth aspect, the communication apparatus in the fifth aspect, the communication apparatus in the sixth aspect, the system chip in the seventh aspect, the system chip in the eighth aspect, the computer storage medium in the ninth aspect, the computer storage medium in the tenth aspect, the computer program product in the eleventh aspect, or the computer program product in the twelfth aspect.

It may be understood that any UE, network device, communication apparatus, system chip, computer storage medium, computer program product, communication system, or the like provided above is configured to perform a corresponding method provided above. Therefore, for beneficial effects that can be achieved by any UE, network device, communication apparatus, system chip, computer storage medium, computer program product, communication system, or the like, refer to beneficial effects in the corresponding method. Details are not described herein again.

BRIEF DESCRIPTION OF THE DRAWINGS

FIG. 4 is a schematic diagram 1 of a bitmap according to an embodiment of this application;

FIG. 5 is a schematic diagram 2 of a bitmap according to an embodiment of this application;

DETAILED DESCRIPTION OF ILLUSTRATIVE EMBODIMENTS

The following describes implementations of embodiments of this application in detail with reference to the accompanying drawings.

Technical solutions provided in this application may be applied to various communication systems, such as a 5G communication system, a future evolved system, or a plurality of converged communication systems, or may be applied to an existing communication system or the like. Application scenarios of the technical solutions provided in this application may include a plurality of application scenarios, such as machine to machine (M2M), macro-micro communication, enhanced mobile broadband (eMBB), ultra-reliable low-latency communication (uRLLC), and massive machine-type communications (mMTC). These application scenarios may include but are not limited to: a scenario of communication between user equipments, a scenario of communication between network devices, a scenario of communication between a network device and a user equipment, and the like. An example in which the technical solutions are applied to the scenario of communication between the network device and the user equipment is used below for description.

Figure 1:
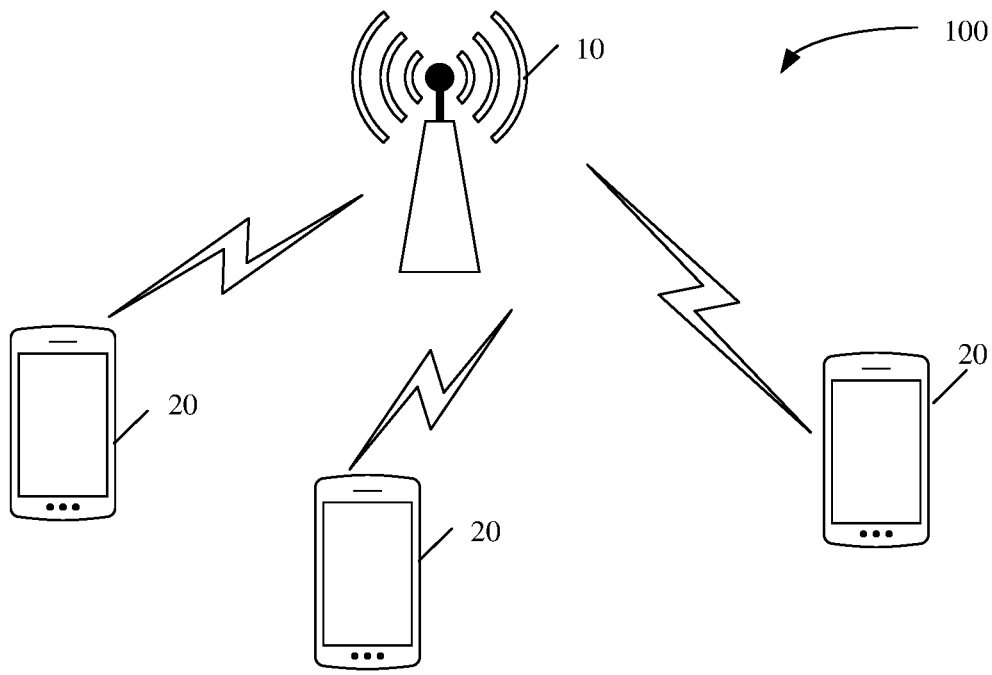
FIG. 1 is a schematic diagram of an architecture of a communication system according to an embodiment of this application.

A communication system shown in FIG. 1 is used below to describe an application scenario of this application.

In FIG. 1, the communication system 100 may include one or more network devices 10 (where only one network device is shown) and one or more user equipment 20 connected to each network device 10. FIG. 1 is merely a schematic diagram, and does not constitute any limitation on a scenario to which the technical solutions provided in this application are applicable.

The network device 10 may be a transmission reception point (TRP), a base station, a relay station, an access point, or the like. The network device 10 may be a network device in a 5G communication system, a network device in a future evolved network, or the like. In addition, the network device may alternatively be a base transceiver station (BTS) in a global system for mobile communications (GSM) or code division multiple access (CDMA) network, an NB (NodeB) in a wideband code division multiple access (WCDMA) network, or an eNB or eNodeB (evolved NodeB) in a long term evolution (LTE) network. The network device 10 may alternatively be a radio controller in a cloud radio access network (CRAN) scenario.

The user equipment 20 may be an access terminal, a UE unit, a UE station, a mobile station, a remote station, a remote terminal, a mobile device, a UE terminal, a wireless communication device, a UE agent, a UE apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, UE in a 5G network, UE in a future evolved public land mobile network (PLMN) network, or the like.

In the communication system 100 shown in FIG. 1, the user equipment 20 may support a plurality of different communication radio access technologies, for example, LTE, NR, GSM, and WCDMA. The following provides descriptions by using an example in which the user equipment 20 supports LTE and NR. For a case in which the user equipment 20 supports another communication radio access technology, refer to corresponding descriptions of a case in which the user equipment 20 supports LTE and NR. Details are not described again.

After an initial connection is established between the user equipment 20 and the network device 10, the network device 10 may query a capability of the UE by sending UE capability enquiry information to the user equipment 20. After receiving the UE capability enquiry information, the user equipment 20 may report the capability of the UE by sending UE capability information to the network device 10.

The UE capability information may include UE multi-RAT dual connectivity capability (UE-MRDC-Capability) information, UE NR capability information, and the like. Multi-RAT dual connectivity of the UE may include a plurality of types of dual connectivity, for example, ENDC, NR-EUTRA dual connectivity (NEDC), and NR dual connectivity (NGENDC). In this application, only the ENDC is used as an example to describe the UE multi-RAT dual connectivity capability information. For another type of dual connectivity, refer to the descriptions of the ENDC, and details are not described again.

The UE multi-RAT dual connectivity capability information and the UE NR capability information may include a physical layer parameter (Phy-parameters), a radio frequency parameter (RF-parameters), a packet data convergence protocol parameter (PDCP-parameters), a radio link control parameter (RLC-parameters), and a media access control parameter (MAC-parameters), and the like of the UE.

The RF-parameters of the UE may include a band combination list supported by the UE (supported band combination list). The band combination list may include a band combination (BandCombination) supported by the UE. The UE may perform a normal service on the band combination that is supported by the UE and included in the band combination list.

The BandCombination may include a band list (bandList), and/or an NRCA parameter (ca-ParametersNR), and/or an EUTRA CA parameter (ca-ParametersEUTRA), and/or a BCS of the BandCombination.

The band list may include one or more bands. The NRCA parameter includes a capability parameter related to CA on an NR band. The EUTRA CA parameter includes a capability parameter related to CA on an EUTRA band. The BCS of the BandCombination indicates a bandwidth combination set of each carrier in the BandCombination.

For example, the RF-parameters includes supportBandCombinationList, and the supportBandCombinationList includes BandCombination 1, BandCombination 2, and the like. The BandCombination 1 includes bandList, ca-ParametersNR, ca-ParametersEUTRA, and a BCS of the BandCombination, where bandList includes a band 1, a band 2, . . . .

Currently, BCSs of band combinations of various types, for example, a BCS of an NRCA band combination (NrCa-BandCombination), a BCS of an intra-band-ENDC band combination, and a BCS of an inter-band-ENDC band combination, are defined in a protocol.

Components of the NRCA band combination are all NR bands (NrBands). For example, for BC_n41C+n78A, n41 indicates an NrBand 41, C indicates that the NrBand 41 includes two carriers, n78 indicates an NrBand 78, and A indicates that the NrBand 78 includes one carrier. Alternatively, the NRCA band combination may include only a single NR band. For example, for CA_n77E, n77 indicates an NrBand 77, and E indicates that the NrBand 77 includes four carriers.

The intra-band-ENDC band combination and the inter-band-ENDC band combination may be collectively referred to as an ENDC band combination (Endc-BandCombination). Endc-BandCombination includes an LTE band (Lte-Band) and NrBand.

If the LteBand and the NrBand that are included in Endc-BandCombination have a same identifier, Endc-BandCombination is referred to as an intra-band-ENDC band combination. For example, BC_41A+n41A indicates BandCombination including an LteBand 41 and an NrBand 41, where 41 indicates the LteBand 41, A indicates that the LteBand 41 includes one carrier, n41 indicates the NrBand 41, and A indicates that the NrBand 41 includes one carrier.

If the LteBand and the NrBand that are included in Endc-BandCombination have different identifiers, Endc-BandCombination is referred to as an inter-band-ENDC band combination. For example, BC_3A+n41A indicates BandCombination including an LteBand 3 and an NrBand 41, where 3 indicates the LteBand 3, A indicates that the LteBand 3 includes one carrier, n41 indicates the NrBand 41, and A indicates that the NrBand 41 includes one carrier.

The BCS may include one or more band combinations, each band combination may include one or more carriers, and each carrier is corresponding to one or more bandwidths. Table 1 shows an example of the BCS of the NRCA band combination. Table 1 shows only a BCS of an NRCA band combination whose ID is 0 (namely, a BCS #0 of the NRCA band combination).

TABLE 1

| NRCA configuration | Carrier channel bandwidth (MHz) | Carrier channel bandwidth (MHz) | Carrier channel bandwidth (MHz) | Carrier channel bandwidth (MHz) | Maximum aggregated bandwidth (MHz) | BCS |
|---|---|---|---|---|---|---|
| CA_n77E | 50 | 60, 80, 100 | 100 | 100 | 400 | 0 |
| CA_n78E | 60 | 60, 80 | 100 | 100 | | |
| CA_n79E | 80 | 80, 90, 100 | 100 | 100 | | |
| | 90 | 100 | 100 | 100 | | |
| | 100 | 100 | 100 | 100 | | |

In Table 1, for CA_n77E, CA_n78E, and CA_n79E, BCSs of the three NRCA configurations (NR CA configurations) are all the BCS #0. The maximum aggregated bandwidth (Maximum aggregated bandwidth) corresponding to the BCS #0 is 400 MHz, and the BCS #0 is corresponding to four carriers. The four carriers may have the following five configurations: In a first configuration, a channel bandwidth for the $1^{st}$ carrier (Channel bandwidths for carrier) is 50 MHz, a channel bandwidth for the $2^{nd}$ carrier is 60 MHz, 80 MHz, or 100 MHz, a channel bandwidth for the $3^{rd}$ carrier is 100 MHz, and a channel bandwidth for the $4^{th}$ carrier is 100 MHz. In a second configuration, a channel bandwidth for the $1^{st}$ carrier is 60 MHz, a channel bandwidth for the $2^{nd}$ carrier is 60 MHz or 80 MHz, a channel bandwidth for the $3^{rd}$ carrier is 100 MHz, and a channel bandwidth for the $4^{th}$ carrier is 100 MHz. In a third configuration, a channel bandwidth for the $1^{st}$ carrier is 80 MHz, a channel bandwidth for the $2^{nd}$ carrier is 80 MHz, 90 MHz, or 100 MHz, a channel bandwidth for the $3^{rd}$ carrier is 100 MHz, and a channel bandwidth for the $4^{th}$ carrier is 100 MHz. In a fourth configuration, a channel bandwidth for the $1^{st}$ carrier is 90 MHz, a channel bandwidth for the $2^{nd}$ carrier is 100 MHz, a channel bandwidth for the $3^{rd}$ carrier is 100 MHz, and a channel bandwidth for the $4^{th}$ carrier is 100 MHz. In a fifth configuration, a channel bandwidth for the $1^{st}$ carrier is 100 MHz, a channel bandwidth for the $2^{nd}$ carrier is 100 MHz, a channel bandwidth for the $3^{rd}$ carrier is 100 MHz, and a channel bandwidth for the $4^{th}$ carrier is 100 MHz.

It should be noted that Table 1 is merely an example of the BCS of the NRCA band combination. During actual application, in addition to the bandwidth combination set (BCS #0) of the carriers shown in Table 1, the BCS may further include a bandwidth combination set in another form, for example, a BCS #1, a BCS #2, and a BCS #3. The BCSs of the foregoing band combinations of various types may be the same or different. For example, a BCS #0 of the NRCA band combination may be the same as or different from a BCS #0 of the intra-band-ENDC band combination.

In a conventional technology, the UE may report a BCS of a band combination supported by the UE to the network device by using an information element supportedBandwidthCombinationSet in BandCombination included in the UE capability information and an information element supportedBandwidthCombinationSetEutra in ca-ParameterSEUTRA included in the BandCombination.

For example, for a BCS of the NRCA band combination supported by the UE, the UE may report the BCS of the NRCA band combination supported by the UE to the network device by using the information element supportedBandwidthCombinationSet.

For another example, for a BCS of the inter-band-ENDC band combination supported by the UE, the UE may report a BCS of an NR component in the inter-band-ENDC band combination supported by the UE to the network device by using the information element supportedBandwidthCombinationSet, and may report a BCS of an EUTRA component in the inter-band-ENDC band combination supported by the UE to the network device by using the information element supportedBandwidthCombinationSetEutra.

For still another example, for a BCS of the intra-band-ENDC band combination supported by the UE, the UE may report the BCS of the intra-band-ENDC band combination supported by the UE to the network device by using the information element supportedBandwidthCombinationSet.

However, as user requirements increase (where for example, user requirements on a bandwidth continuously increase) or an operator needs to deploy a network, in addition to existing types of band combination such as the NRCA band combination, the intra-band-ENDC band combination, and the inter-band-ENDC band combination, a new type of band combination, for example, a band combination (for example, DC_71A_n71A-n78C) including the intra-band-ENDC band combination and the NRCA, may occur. Currently, if the UE supports the new type of band combination, the UE cannot report, by using the existing information element supportedBandwidthCombinationSet and/or the existing information element supportedBandwidthCombinationSetEutra, a BCS of the NRCA corresponding to the new type of band combination supported by the UE.

To resolve the foregoing problem, an embodiment of this application provides a UE capability information reporting method. The method includes: A network device sends UE capability enquiry information to UE. After receiving the UE capability enquiry information, the UE sends UE capability information to the network device. The UE capability information may indicate that the UE supports a band combination including an intra-band-ENDC band combination and NRCA. The UE capability information may include first information and second information. The first information includes a bandwidth combination set of the intra-band-ENDC band combination in the band combination that includes the intra-band-ENDC band combination and the NRCA and is supported by the UE. The second information includes a bandwidth combination set of the NRCA in the band combination that includes the intra-band-ENDC band combination and the NRCA and is supported by the UE. Specifically, for descriptions of the UE capability information reporting method, refer to the descriptions in the method shown in FIG. 3.

During specific implementation, each network element in FIG. 1 in the embodiments of this application, for example, the network device 10 or the user equipment 20, may be a function module in a device. It may be understood that the function module may be a network element in a hardware device, for example, a communication chip in a mobile phone, may be a software function running on dedicated hardware, or may be a virtual function instantiated on a platform (for example, a cloud platform).

Figure 2:
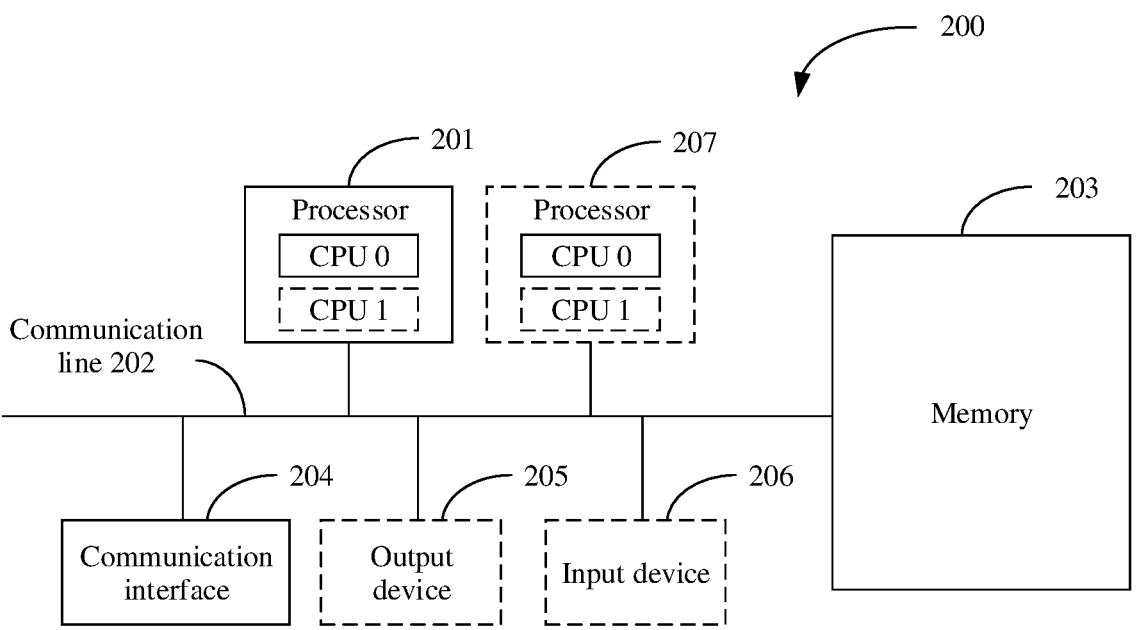
FIG. 2 is a schematic diagram of a structure of hardware of a communication device according to an embodiment of this application.

For example, each network element in FIG. 1 may be implemented by using a communication device 200 in FIG. 2. FIG. 2 is a schematic diagram of a hardware structure of a communication device applicable to an embodiment of this application. The communication device 200 may include at least one processor 201, a communication line 202, a memory 203, and at least one communication interface 204.

The processor 201 may be a general-purpose central processing unit (CPU), a microprocessor, an application-specific integrated circuit (ASIC), or one or more integrated circuits configured to control program execution of the solutions of this application.

The communication line 202 may include a path such as a bus for transmitting information between the foregoing components.

The communication interface 204, an apparatus using a transceiver, is configured to communicate with another device or a communication network, and is, for example, an Ethernet interface, a radio access network (RAN) interface, or a wireless local area network (WLAN) interface.

The memory 203 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory may exist independently, and is connected to the processor by using the communication line 202. Alternatively, the memory may be integrated with the processor. The memory provided in this embodiment of this application may usually be non-volatile. The memory 203 is configured to store computer-executable instructions for executing the solution in this application, and the execution is controlled by the processor 201. The processor 201 is configured to execute the computer-executable instructions stored in the memory 203, to implement the method provided in the embodiments of this application.

Optionally, the computer-executable instructions in this embodiment of this application may also be referred to as application program code. This is not specifically limited in this embodiment of this application.

During specific implementation, in an embodiment, the processor 201 may include one or more CPUs, for example, a CPU 0 and a CPU 1 in FIG. 2.

During specific implementation, in an embodiment, the communication device 200 may include a plurality of processors, for example, the processor 201 and a processor 207 in FIG. 2. Each of the processors may be a single-core (single-CPU) processor, or a multi-core (multi-CPU) processor. The processor herein may be one or more devices, circuits, and/or processing cores configured to process data (for example, computer program instructions).

During specific implementation, in an embodiment, the communication device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive a user input in a plurality of manners. For example, the input device 206 may be a mouse, a keyboard, a touchscreen device, or a sensing device.

During specific implementation, the communication device 200 may be a network server, a mobile phone, a tablet computer, a wireless terminal device, an embedded device, or a device having a structure similar to that shown in FIG. 2. A type of the communication device 200 is not limited in this embodiment of this application.

The UE capability information reporting method provided in the embodiments of this application is specifically described below with reference to FIG. 1 and FIG. 2. A network element described in the following embodiment may have parts shown in FIG. 2.

It should be noted that names of messages between the network elements, names of parameters in the messages, or the like in the following embodiments of this application are merely examples, and there may be other names during specific implementation. This is not specifically limited in the embodiments of this application.

It may be understood that, in the embodiments of this application, user equipment may perform some or all of steps in the embodiments of this application. The steps are merely examples. In the embodiments of this application, other steps or variations of various steps may further be performed. In addition, the steps may be performed in a sequence different from a sequence presented in the embodiments of this application, and not all steps in the embodiments of this application need to be performed.

Figure 3:
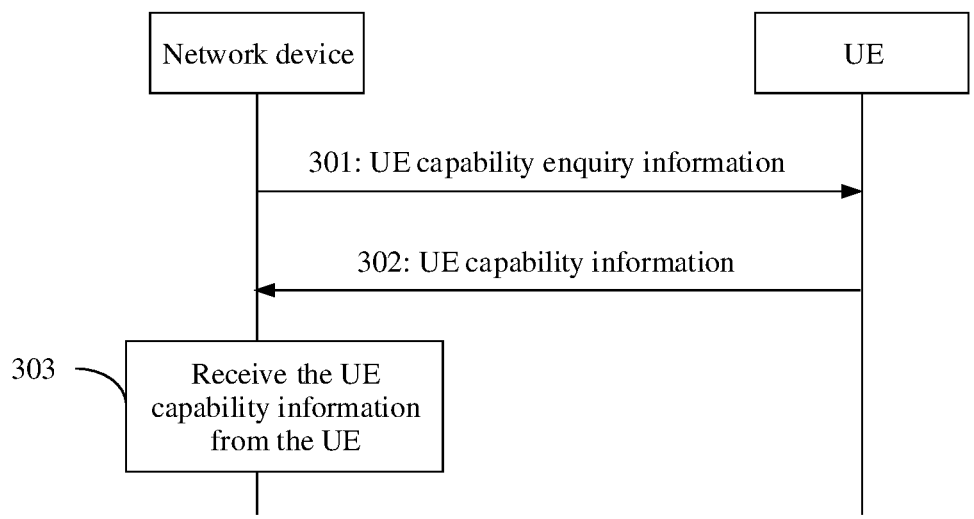
FIG. 3 is a schematic flowchart 1 of a UE capability information reporting method according to an embodiment of this application.

FIG. 3 shows a UE capability information reporting method according to an embodiment of this application. The method may include step 301 to step 303.

Step 301: A network device sends UE capability enquiry information to UE.

The network device may be the network device 10 in FIG. 1. The UE may be the user equipment 20 in FIG. 1, and the UE may support a plurality of different communication radio access technologies.

The UE capability enquiry information is used to query a capability of the UE. Specifically, the UE capability enquiry information may be signaling UECapabilityEnquiry.

Optionally, the capability of the UE is pre-configured by a vendor on the UE. The capability of the UE may include a multi-RAT dual connectivity capability of the UE, an NR capability of the UE, and the like. The capability of the UE may further include: Phy-Parameters, PDCP-Parameters, RLC-Parameters, MAC-Parameters, and the like. An example in which the multi-RAT dual connectivity capability of the UE is queried is used in this embodiment of this application for description.

For example, that a network device sends UE capability enquiry information to UE may include: The network device sends radio resource control (RRC) signaling to the UE, where the RRC signaling includes the UE capability enquiry information.

Step 302: The UE receives the UE capability enquiry information from the network device, and sends UE capability information to the network device based on the UE capability enquiry information.

For example, that the UE receives the UE capability enquiry information from the network device may include: The UE receives the RRC signaling from the network device, where the RRC signaling includes the UE capability enquiry information; and the UE obtains the UE capability enquiry information from the RRC signaling after receiving the RRC signaling.

For example, that the UE sends UE capability information to the network device based on the UE capability enquiry information may include: The UE capability enquiry information is a trigger condition for the UE to send the UE capability information to the network device, and once the UE receives the UE capability enquiry information sent by the network device, the UE queries the capability of the UE configured on the UE, and sends the found capability of the UE to the network device. The UE may send RRC signaling to the network device, where the RRC signaling includes the UE capability information.

The UE capability information may be signaling UECapabilityInformation.

Optionally, the UE capability information may include a multi-RAT dual connectivity radio frequency parameter (RF-ParametersMRDC) of a capability report UE-MRDC-Capability. The UE capability information may be used to indicate that the UE supports a first-type band combination. The first-type band combination includes a band combination including an intra-band ENDC band combination and NRCA.

The intra-band ENDC band combination in the first-type band combination includes an LteBand and an NrBand, and an identifier of the LteBand is the same as that of the NrBand. The NRCA in the first-type band combination includes one or more NrBands.

For example, the first-type band combination is DC_71A_n71A-n78C. The intra-band ENDC band combination in the first-type band combination includes an LteBand 71 and an NrBand 71. The NRCA in the first-type band combination includes an NrBand 78. Alternatively, the intra-band ENDC band combination in the first-type band combination includes an LteBand 71 and an NrBand 71, and the NRCA in the first-type band combination includes the NrBand 71 and an NrBand 78.

For example, the first-type band combination may further include another LTE or NR band combination, for example, LTE CA.

Further, optionally, the UE capability information is further used to indicate that the UE supports another type of band combination such as a second-type band combination and a third-type band combination. This is not limited. The second-type band combination is an intra-band ENDC band combination. The third-type band combination is an inter-band ENDC band combination.

For descriptions of the first-type band combination, the second-type band combination, and the third-type band combination, refer to the descriptions in the communication system shown in FIG. 1. Details are not described herein again.

It should be noted that, during specific implementation, the first-type band combination may further include another type of band combination other than the band combination including the intra-band ENDC band combination and the NRCA, the second-type band combination, and the third-type band combination, for example, a band combination including an EUTRA band combination and the NRCA. This is not specifically limited in this embodiment of this application.

Optionally, the UE capability information includes first information and second information.

When the UE capability information is used to indicate the first-type band combination supported by the UE, the first information may include a first bandwidth combination set of the intra-band ENDC in the first-type band combination supported by the UE, and the second information may be used to indicate a second bandwidth combination set of the NRCA in the first-type band combination supported by the UE. Design forms of the first information and the second information may have the following two cases.

Case 1: The first information may be an information element supportBandCombinationList, and the second information may be an added information element included in the multi-RAT dual connectivity radio frequency parameter (RF-ParametersMRDC) in the capability report UE-MRDC-Capability of the UE capability information. The added information element may be named as a band combination list version 1xxx supported by the UE (supportedBandCombinationList_v1xxx), where 1xxx indicates a version number of the band combination list supported by the UE.

When the UE capability information is used to indicate the second-type band combination and the third-type band combination supported by the UE, the first information may include a third bandwidth combination set of the second-type band combination supported by the UE and a fourth bandwidth combination set of the third-type band combination, and the second information is empty. That is, the second information provides no indication. The fourth bandwidth combination set includes a bandwidth combination set of an NR component in the third-type band combination supported by the UE and a bandwidth combination set of an EUTRA component in the third-type band combination supported by the UE.

For example, a specific design form of the first information may be as follows:

The information element supportBandCombinationList includes one or more band combinations, for example, may include n band combinations. Each band combination may include an information element SupportedBandwidthCombinationSet and other information, for example, a band list, and/or an NRCA parameter, and/or an EUTRA CA parameter that are/is supported by the UE, where the EUTRA CA parameter may include an information element SupportedBandwidthCombinationSetEutra. SupportedBandwidthCombinationSetEutra is used to indicate the bandwidth combination set of the EUTRA component in the third-type band combination supported by the UE. For descriptions of the band list, the NRCA parameter, and the EUTRA CA parameter that are supported by the UE, refer to the descriptions in the communication system shown in FIG. 1. Details are not described herein again.

The information element supportBandCombinationList may include a plurality of information elements SupportedBandwidthCombinationSet. For example, when the UE capability information is used to indicate the first-type band combination and the second-type band combination supported by the UE, the information element supportBandCombinationList includes SupportedBandwidthCombinationSet1 and SupportedBandwidthCombinationSet2. SupportedBandwidthCombinationSet1 is used to indicate the first bandwidth combination set of the intra-band ENDC in the first-type band combination supported by the UE, and SupportedBandwidthCombinationSet2 is used to indicate the third bandwidth combination set of the second-type band combination supported by the UE.

Specifically, the information element SupportedBandwidthCombinationSet is a string of t bits in length, the t bits are corresponding to t different bandwidth combination sets, and t is an integer greater than or equal to 1. An $i^{th}$ bit in the t bits is used to indicate whether the UE supports a bandwidth combination set corresponding to the $i^{th}$ bit, and i is an integer greater than or equal to 0 and less than or equal to t.

Optionally, the $i^{th}$ bit in the t bits indicates, by using 0 or 1, whether the UE supports the bandwidth combination set corresponding to the $i^{th}$ bit. For example, if the $i^{th}$ bit in the t bits is 0, it indicates that the UE does not support the bandwidth combination set corresponding to the $i^{th}$ bit; or if the $i^{th}$ bit in the t bits is 1, it indicates that the UE supports the bandwidth combination set corresponding to the $i^{th}$ bit, and vice versa.

In this embodiment of this application, the bandwidth combination set is predefined. For example, the bandwidth combination set is a bandwidth combination set defined in a protocol. For descriptions of the bandwidth combination set, refer to the descriptions in the communication system shown in FIG. 1. Details are not described herein again.

For example, 32 bandwidth combination sets: a BCS #0 to a BCS #31, are defined in the protocol. The information element SupportedBandwidthCombinationSet includes 32 bits, and each bit is corresponding to one bandwidth combination set. For example, the $0^{th}$ bit is corresponding to the BCS #0, the $1^{st}$ bit is corresponding to the BCS #1 . . . , and the $31^{st}$ bit is corresponding to the BCS #31. If the first bandwidth combination set includes the BCS #2, the BCS #23, and the BCS #30, bits included in the information element SupportedBandwidthCombinationSet are shown in FIG. 4. FIG. 4 shows a bitmap of the information element SupportedBandwidthCombinationSet provided in this embodiment of this application. The bitmap shown in FIG. 4 includes 32 bits, where the $2^{nd}$ bit, the $23^{rd}$ bit, and the $30^{th}$ bit are 1. This indicates that the intra-band ENDC in the first-type band combination supported by the UE supports the BCS #2, the BCS #23, and the BCS #30. Other bits than the $2^{nd}$ bit, the $23^{rd}$ bit, and the $30^{th}$ bit are 0. This indicates that the intra-band ENDC in the first-type band combination supported by the UE supports only the BCS #2, the BCS #23, and the BCS #30.

For example, a specific design form of the second information may be as follows:

supportedBandCombinationList_v1xxx may include one or more band combinations v1xxx (BandCombination_v1xxx), and BandCombination_v1xxx may include an information element addSupportedBandwidthCombinationSet. The information element addSupportedBandwidthCombinationSet may be used to indicate the second bandwidth combination set of the NRCA corresponding to the first-type band combination supported by the UE. The information element addSupportedBandwidthCombinationSet is an optional reporting information element. For example, if the UE supports the first-type band combination, BandCombination_v1xxx includes addSupportedBandwidthCombinationSet. If the UE does not support the first-type band combination, BandCombination_v1xxx does not include addSupportedBandwidthCombinationSet. For example, when the UE supports only the second-type band combination and the third-type band combination, BandCombination_v1xxx included in SupportedBandCombinationList_v1xxx does not include addSupportedBandwidthCombinationSet, and the second information is empty.

A quantity of BandCombination_v1xxx included in supportedBandCombinationList_v1xxx is the same as a quantity of BandCombination included in supportedBandCombinationList. Specifically, for the correspondence, refer to the descriptions in the following first implementation scenario of the method shown in FIG. 3.

It should be noted that the naming of the second information is not limited in this embodiment of this application, and the second information may alternatively be replaced with another information name having a same function as the second information.

In a possible implementation, the second information includes m bits. For example, the information element addSupportedBandwidthCombinationSet in the second information includes m bits. The m bits are corresponding to m different bandwidth combination sets, and m is an integer greater than or equal to 1. An $i^{th}$ bit in the m bits is used to indicate whether the UE supports a bandwidth combination set corresponding to the $i^{th}$ bit, and i is an integer greater than or equal to 0 and less than or equal to m.

Optionally, the $i^{th}$ bit in the m bits indicates, by using 0 or 1, whether the UE supports the bandwidth combination set corresponding to the $i^{th}$ bit. For example, if the $i^{th}$ bit in the m bits is 0, it indicates that the UE does not support the bandwidth combination set corresponding to the $i^{th}$ bit; or if the $i^{th}$ bit in the m bits is 1, it indicates that the UE supports the bandwidth combination set corresponding to the $i^{th}$ bit, and vice versa.

It should be noted that m and t may be the same or different, and the m bandwidth combination sets corresponding to the m bits may be the same as or different from the t bandwidth combination sets corresponding to the t bits.

For example, 32 bandwidth combination sets, a BCS #0 to a BCS #31, are defined in the protocol. The information element addSupportedBandwidthCombinationSet includes 32 bits, and each bit is corresponding to one bandwidth combination set. For example, the $0^{th}$ bit is corresponding to the BCS #0, the $1^{st}$ bit is corresponding to the BCS #1, . . . , and the $31^{st}$ bit is corresponding to the BCS #31. If the second bandwidth combination set includes the BCS #0, the BCS #3, and the BCS #5, bits included in the information element addSupportedBandwidthCombinationSet are shown in FIG. 5. FIG. 5 shows a bitmap of the information element addSupportedBandwidthCombinationSet provided in this embodiment of this application. The bitmap shown in FIG. 5 includes 32 bits, where the $0^{th}$ bit, the $3^{rd}$ bit, and the 5th bit are 1. This indicates that the NRCA in the first-type band combination supported by the UE supports the BCS #0, the BCS #3, and the BCS #5. Other bits than the $0^{th}$ bit, the $3^{rd}$ bit, and the $5^{th}$ bit are 0. This indicates that the NRCA in the first-type band combination supported by the UE supports only the BCS #0, the BCS #3, and the BCS #5.

Optionally, if the first-type band combination supported by the UE includes the n band combinations supported by the UE, the second bandwidth combination set is all bandwidth combination sets of the NRCA corresponding to the n band combinations.

For example, the first-type band combination supported by the UE includes a band combination 1 and a band combination 2, where BCSs of the NRCA corresponding to the band combination 1 are a BCS #3 and a BCS #4, and BCSs of the NRCA corresponding to the band combination 2 are a BCS #10 and a BCS #19. In this case, the second information may include addSupportedBandwidthCombinationSet1 and addSupportedBandwidthCombinationSet2. As shown in Table 2, the information element addSupportedBandwidthCombinationSet1 is used to indicate the BCS #3 and the BCS #4, the information element addSupportedBandwidthCombinationSet2 is used to indicate the BCS #10 and the BCS #19, and the second bandwidth combination set may include the BCS #3, the BCS #4, the BCS #10, and the BCS #19.

TABLE 2

| Information element | Bandwidth combination sets of the NRCA corresponding to a band combination |
|---|---|
| addSupportedBandwidthCombinationSet1 | BCS #3 and BCS #4 |
| addSupportedBandwidthCombinationSet2 | BCS #10 and BCS #19 |

Case 2: The first information may be an added information element supportedBandCombinationList_v1xxx, and the second information may be an information element supportBandCombinationList.

When the UE capability information is used to indicate the second-type band combination and the third-type band combination supported by the UE, the second information may include a third bandwidth combination set of the second-type band combination supported by the UE and a fourth bandwidth combination set of the third-type band combination, and the first information is empty. That is, the first information provides no indication. The fourth bandwidth combination set includes a bandwidth combination set of an NR component in the third-type band combination supported by the UE and a bandwidth combination set of an EUTRA component in the third-type band combination supported by the UE.

For example, a specific design form of the first information may be as follows:
supportedBandCombinationList_v1xxx may include one or more BandCombination_v1xxx, and BandCombination_v1xxx may include an information element addSupportedBandwidthCombinationSet. The information element addSupportedBandwidthCombinationSet may be used to indicate the first bandwidth combination set of the intra-band ENDC corresponding to the first-type band combination supported by the UE. The information element addSupportedBandwidthCombinationSet is an optional reporting information element. For example, if the UE supports the first-type band combination, BandCombination_v1xxx includes addSupportedBandwidthCombinationSet. If the UE does not support the first-type band combination, BandCombination_v1xxx does not include addSupportedBandwidthCombinationSet. For example, when the UE supports only the second-type band combination and the third-type band combination, BandCombination_v1xxx included in SupportedBandCombinationList_v1xxx does not include addSupportedBandwidthCombinationSet, and the first information is empty.

A quantity of BandCombination_v1xxx included in supportedBandCombinationList_v1xxx is the same as a quantity of BandCombination included in supportedBandCombinationList. Specifically, for the correspondence, refer to the descriptions in the following second implementation scenario of the method shown in FIG. 3.

It should be noted that the naming of the first information is not limited in this embodiment of this application, and the first information may alternatively be replaced with another information name having a same function as the first information.

In a possible implementation, the first information includes m bits. For example, the information element addSupportedBandwidthCombinationSet in the first information includes m bits. The m bits are corresponding to m different bandwidth combination sets, and m is an integer greater than or equal to 1. An $i^{th}$ bit in the m bits is used to indicate whether the UE supports a bandwidth combination set corresponding to the $i^{th}$ bit, and i is an integer greater than or equal to 0 and less than or equal to m.

Optionally, the $i^{th}$ bit in the m bits indicates, by using 0 or 1, whether the UE supports the bandwidth combination set corresponding to the $i^{th}$ bit. For example, if the $i^{th}$ bit in the m bits is 0, it indicates that the UE does not support the bandwidth combination set corresponding to the $i^{th}$ bit; or if the $i^{th}$ bit in the m bits is 1, it indicates that the UE supports the bandwidth combination set corresponding to the $i^{th}$ bit, and vice versa.

Optionally, if the first-type band combination supported by the UE includes the n band combinations supported by the UE, the first bandwidth combination set is all bandwidth combination sets of the intra-band ENDC corresponding to the n band combinations.

For example, a specific design form of the second information may be as follows:
The information element supportBandCombinationList includes one or more band combinations, for example, may include n band combinations. Each band combination may include an information element SupportedBandwidthCombinationSet and other information, for example, a band list, and/or an NRCA parameter, and/or an EUTRA CA parameter that are/is supported by the UE, where the EUTRA CA parameter may include an information element SupportedBandwidthCombinationSetEutra.

SupportedBandwidthCombinationSetEutra is used to indicate the bandwidth combination set of the EUTRA component in the third-type band combination supported by the UE. For descriptions of the band list, the NRCA parameter, and the EUTRA CA parameter that are supported by the UE, refer to the descriptions in the communication system shown in FIG. 1. Details are not described herein again.

The information element supportBandCombinationList may include a plurality of information elements SupportedBandwidthCombinationSet. For example, when the UE capability information is used to indicate the first-type band combination and the second-type band combination supported by the UE, the information element supportBandCombinationList includes SupportedBandwidthCombinationSet1 and SupportedBandwidthCombinationSet2. SupportedBandwidthCombinationSet1 is used to indicate the second bandwidth combination set of the NRCA in the first-type band combination supported by the UE, and SupportedBandwidthCombinationSet2 is used to indicate the third bandwidth combination set of the second-type band combination supported by the UE.

Specifically, the information element SupportedBandwidthCombinationSet is a string of t bits in length, the t bits are corresponding to t different bandwidth combination sets, and t is an integer greater than or equal to 1. An $i^{th}$ bit in the t bits is used to indicate whether the UE supports a bandwidth combination set corresponding to the $i^{th}$ bit, and i is an integer greater than or equal to 0 and less than or equal to t.

Optionally, the $i^{th}$ bit in the t bits indicates, by using 0 or 1, whether the UE supports the bandwidth combination set corresponding to the $i^{th}$ bit. For example, if the $i^{th}$ bit in the t bits is 0, it indicates that the UE does not support the bandwidth combination set corresponding to the $i^{th}$ bit; or if the $i^{th}$ bit in the t bits is 1, it indicates that the UE supports the bandwidth combination set corresponding to the $i^{th}$ bit, and vice versa.

In this embodiment of this application, the bandwidth combination set is predefined. For example, the bandwidth combination set is a bandwidth combination set defined in a protocol. For descriptions of the bandwidth combination set, refer to the descriptions in the communication system shown in FIG. 1. Details are not described herein again.

It should be noted that m and t may be the same or different, and the m bandwidth combination sets corresponding to the m bits may be the same as or different from the t bandwidth combination sets corresponding to the t bits.

Step 303: The network device receives the UE capability information from the UE.

For example, that the network device receives the UE capability information from the UE may include: The network device receives RRC signaling from the UE, where the RRC signaling includes the UE capability information; and the network device obtains the UE capability information from the RRC signaling after receiving the RRC signaling.

Based on the method shown in FIG. 3, the UE receives the UE capability enquiry information from the network device, and reports the bandwidth combination sets of the first-type band combination supported by the UE to the network device based on the UE capability enquiry information and by using the first information and the second information included in the UE capability information, so that the network device allocates resources to the UE based on the bandwidth combination sets of the first-type band combination supported by the UE.

Optionally, in the first implementation scenario in the embodiment shown in FIG. 3, the first information includes the first bandwidth combination set of the intra-band ENDC in the first-type band combination supported by the UE and the first-type band combination supported by the UE.

Optionally, if the first-type band combination supported by the UE includes the n band combinations supported by the UE, the first bandwidth combination set may be all bandwidth combination sets of the intra-band ENDC corresponding to the n band combinations.

For example, the first-type band combination supported by the UE includes a band combination 1 and a band combination 2, where BCSs of the intra-band ENDC corresponding to the band combination 1 are a BCS #0 and a BCS #2, and BCSs of the intra-band ENDC corresponding to the band combination 2 are a BCS #5 and a BCS #8. In this case, the first information may be shown in Table 3, and the first bandwidth combination set may include the BCS #0, the BCS #2, the BCS #5, and the BCS #8.

TABLE 3

| Band combination | Bandwidth combination sets of the intra-band ENDC corresponding to a band combination |
|---|---|
| Band combination 1 | BCS #0 and BCS #2 |
| Band combination 2 | BCS #5 and BCS #8 |

It should be noted that Table 3 is merely an example of the first information. The first information may alternatively be information in another form, for example, in an array form. A specific form of the first information is not limited in this embodiment of this application.

It should be noted that a quantity of BandCombination_v1xxx included in the second information is the same as a quantity of BandCombination included in the first information. In addition, a $j^{th}$ band combination included in the first information and a $j^{th}$ BandCombination_v1xxx included in the second information jointly indicate a bandwidth combination set of the $j^{th}$ band combination.

BandCombination included in the first information and BandCombination_v1xxx included in the second information are described below by using two cases.

Case 1: The first information does not include a band combination other than the first-type band combination supported by the UE.

For example, the first information includes BandCombination1, BandCombination2, and BandCombination3, where BandCombination1, BandCombination2, and BandCombination3 are first-type band combinations supported by the UE. For example, the second information includes BandCombination_v1xxx_1, BandCombination_v1xxx_2, and BandCombination_v1xxx_3. If an information element SupportedBandwidthCombinationSet1 in BandCombination1 indicates that a bandwidth combination set of the intra-band ENDC corresponding to BandCombination1 is a BCS #1, an information element SupportedBandwidthCombinationSet2 in BandCombination2 indicates that bandwidth combination sets of the intra-band ENDC corresponding to BandCombination2 are a BCS #3 and a BCS #4, an information element SupportedBandwidthCombinationSet3 in BandCombination3 indicates that a bandwidth combination set of the intra-band ENDC corresponding to BandCombination3 is a BCS #5, an information element addSupportedBandwidthCombinationSet1 in BandCombination_v1xxx_1 indicates that a bandwidth combination set of the NRCA corresponding to BandCombination1 is the BCS #3, an information element addSupportedBandwidthCombinationSet2 in BandCombination_v1xxx_2 indicates that a bandwidth combination set of the NRCA corresponding to BandCombination2 is the BCS #5, and an information element addSupportedBandwidthCombinationSet3 in BandCombination_v1xxx_3 indicates that a bandwidth combination set of the NRCA corresponding to BandCombination3 is a BCS #7. In this case, the information element SupportedBandwidthCombinationSet1 and the information element addSupportedBandwidthCombinationSet1 jointly indicate the bandwidth combination sets of BandCombination1, the information element SupportedBandwidthCombinationSet2 and the information element addSupportedBandwidthCombinationSet2 jointly indicate the bandwidth combination sets of BandCombination2, and the information element SupportedBandwidthCombinationSet3 and the information element addSupportedBandwidthCombinationSet3 jointly indicate the bandwidth combination sets of BandCombination3.

In the foregoing example, the bandwidth combination sets of BandCombination1 include a first bandwidth combination set of BandCombination1 and a second bandwidth combination set of BandCombination1, where the first bandwidth combination set of BandCombination1 includes the BCS #1, and the second bandwidth combination set of BandCombination1 includes the BCS #3.

In the foregoing example, the bandwidth combination sets of BandCombination2 include a first bandwidth combination set of BandCombination2 and a second bandwidth combination set of BandCombination2, where the first bandwidth combination set of BandCombination2 includes the BCS #3 and the BCS #4, and the second bandwidth combination set of BandCombination2 includes the BCS #5.

In the foregoing example, the bandwidth combination sets of BandCombination3 include a first bandwidth combination set of BandCombination3 and a second bandwidth combination set of BandCombination3, where the first bandwidth combination set of BandCombination3 includes the BCS #5, and the second bandwidth combination set of BandCombination3 includes the BCS #7.

Case 2: The first information includes the first-type band combination supported by the UE and a band combination other than the first-type band combination supported by the UE.

For example, the first information includes BandCombination1, BandCombination2, and BandCombination3, where BandCombination1 and BandCombination3 are first-type band combinations supported by the UE, and BandCombination2 is a second-type band combination supported by the UE. For example, the second information includes BandCombination_v1xxx_1, BandCombination_v1xxx_2, and BandCombination_v1xxx_3. If an information element SupportedBandwidthCombinationSet1 in BandCombination1 indicates that a bandwidth combination set of the intra-band ENDC corresponding to BandCombination1 is a BCS #1, an information element SupportedBandwidthCombinationSet2 in BandCombination2 indicates that bandwidth combination sets of BandCombination2 are a BCS #3 and a BCS #4, an information element SupportedBandwidthCombinationSet3 in BandCombination3 indicates that a bandwidth combination set of the intra-band ENDC corresponding to BandCombination3 is a BCS #5, an information element addSupportedBandwidthCombinationSet1 in BandCombination_v1xxx_1 indicates that a bandwidth combination set of the NRCA corresponding to BandCombination1 is the BCS #3, BandCombination_v1xxx_2 does not include an information element addSupportedBandwidthCombinationSet, and an information element addSupportedBandwidthCombinationSet3 in BandCombination_v1xxx_3 indicates that a bandwidth combination set of the NRCA corresponding to BandCombination3 is a BCS #7. In this case, the information element SupportedBandwidthCombinationSet1 and the information element addSupportedBandwidthCombinationSet1 jointly indicate the bandwidth combination sets of BandCombination1, the information element SupportedBandwidthCombinationSet2 and BandCombination_v1xxx_2 that does not include the information element addSupportedBandwidthCombinationSet jointly indicate the bandwidth combination sets of BandCombination2, and the information element SupportedBandwidthCombinationSet3 and the information element addSupportedBandwidthCombinationSet3 jointly indicate the bandwidth combination sets of BandCombination3.

In the foregoing example, the bandwidth combination sets of BandCombination1 include a first bandwidth combination set of BandCombination1 and a second bandwidth combination set of BandCombination1, where the first bandwidth combination set of BandCombination1 includes the BCS #1, and the second bandwidth combination set of BandCombination1 includes the BCS #3.

In the foregoing example, the bandwidth combination sets of BandCombination2 include a third bandwidth combination set of BandCombination2 and a second bandwidth combination set of BandCombination2, where the third bandwidth combination set of BandCombination2 includes the BCS #3 and the BCS #4, and the second bandwidth combination set of BandCombination2 is empty (where because the information element BandCombination_v1xxx_2 does not include the information element addSupportedBandwidthCombinationSet).

In the foregoing example, the bandwidth combination sets of BandCombination3 include a first bandwidth combination set of BandCombination3 and a second bandwidth combination set of BandCombination3, where the first bandwidth combination set of BandCombination3 includes the BCS #5, and the second bandwidth combination set of BandCombination3 includes the BCS #7.

Based on the first implementation scenario shown in FIG. 3, the UE may report, to the network device by using the first information, all the bandwidth combination sets of the intra-band ENDC corresponding to the n band combinations included in the first-type band combination. The UE may report, to the network device by using the second information, all the bandwidth combination sets of the NRCA corresponding to the n band combinations included in the first-type band combination. In this way, the network device allocates resources to the UE based on all the intra-band ENDC bandwidth combination sets and all the NRCA bandwidth combination sets corresponding to the n band combinations included in the first-type band combination supported by the UE.

Optionally, in the second implementation scenario in the embodiment shown in FIG. 3, the second information includes the second bandwidth combination set of the NRCA in the first-type band combination supported by the UE and the first-type band combination supported by the UE.

Optionally, if the first-type band combination supported by the UE includes the n band combinations supported by the UE, the first bandwidth combination set may be all bandwidth combination sets of the NRCA corresponding to the n band combinations.

It should be noted that a quantity of BandCombination_v1xxx included in the first information is the same as a quantity of BandCombination included in the second information. In addition, a $j^{th}$ band combination included in the second information and a $j^{th}$ BandCombination_v1xxx included in the first information jointly indicate a bandwidth combination set of the $j^{th}$ band combination.

BandCombination included in the second information and BandCombination_v1xxx included in the first information are described below by using two cases.

Case 1: The second information does not include a band combination other than the first-type band combination supported by the UE.

For example, the second information includes BandCombination1, BandCombination2, and BandCombination3, where BandCombination1, BandCombination2, and BandCombination3 are first-type band combinations supported by the UE. For example, the first information includes BandCombination_v1xxx_1, BandCombination_v1xxx_2, and BandCombination_v1xxx_3. If an information element SupportedBandwidthCombinationSet1 in BandCombination1 indicates that a bandwidth combination set of the NRCA corresponding to BandCombination1 is a BCS #2, an information element SupportedBandwidthCombinationSet2 in BandCombination2 indicates that a bandwidth combination set of the NRCA corresponding to BandCombination2 is a BCS #5, an information element SupportedBandwidthCombinationSet3 in BandCombination3 indicates that a bandwidth combination set of the NRCA corresponding to BandCombination3 is a BCS #10, an information element addSupportedBandwidthCombinationSet1 in BandCombination_v1xxx_1 indicates that a bandwidth combination set of the intra-band ENDC corresponding to BandCombination1 is a BCS #4, an information element addSupportedBandwidthCombinationSet2 in BandCombination_v1xxx_2 indicates that a bandwidth combination set of the intra-band ENDC corresponding to BandCombination2 is a BCS #8, and an information element addSupportedBandwidthCombinationSet3 in BandCombination_v1xxx_3 indicates that a bandwidth combination set of the intra-band ENDC corresponding to BandCombination3 is a BCS #12. In this case, the information element SupportedBandwidthCombinationSet1 and the information element addSupportedBandwidthCombinationSet1 jointly indicate the bandwidth combination sets of BandCombination1, the information element SupportedBandwidthCombinationSet2 and the information element addSupportedBandwidthCombinationSet2 jointly indicate the bandwidth combination sets of BandCombination2, and the information element SupportedBandwidthCombinationSet3 and the information element addSupportedBandwidthCombinationSet3 jointly indicate the bandwidth combination sets of BandCombination3.

In the foregoing example, the bandwidth combination sets of BandCombination1 include a first bandwidth combination set of BandCombination1 and a second bandwidth combination set of BandCombination1, where the first bandwidth combination set of BandCombination1 includes the BCS #4, and the second bandwidth combination set of BandCombination1 includes the BCS #2.

In the foregoing example, the bandwidth combination sets of BandCombination2 include a first bandwidth combination set of BandCombination2 and a second bandwidth combination set of BandCombination2, where the first bandwidth combination set of BandCombination2 includes the BCS #8, and the second bandwidth combination set of BandCombination2 includes the BCS #5.

In the foregoing example, the bandwidth combination sets of BandCombination3 include a first bandwidth combination set of BandCombination3 and a second bandwidth combination set of BandCombination3, where the first bandwidth combination set of BandCombination3 includes the BCS #12, and the second bandwidth combination set of BandCombination3 includes the BCS #10.

Case 2: The second information includes the first-type band combination supported by the UE and a band combination other than the first-type band combination supported by the UE.

For example, the second information includes BandCombination1, BandCombination2, and BandCombination3, where BandCombination1 and BandCombination3 are first-type band combinations supported by the UE, and BandCombination2 is a second-type band combination supported by the UE. For example, the first information includes BandCombination_v1xxx_1, BandCombination_v1xxx_2, and BandCombination_v1xxx_3. If an information element SupportedBandwidthCombinationSet1 in BandCombination1 indicates that a bandwidth combination set of the NRCA corresponding to BandCombination1 is a BCS #3, an information element SupportedBandwidthCombinationSet2 in BandCombination2 indicates that bandwidth combination sets of BandCombination2 are a BCS #5 and a BCS #7, an information element SupportedBandwidthCombinationSet3 in BandCombination3 indicates that a bandwidth combination set of the NRCA corresponding to BandCombination3 is a BCS #8, an information element addSupportedBandwidthCombinationSet1 in BandCombination_v1xxx_1 indicates that a bandwidth combination set of the intra-band ENDC corresponding to BandCombination1 is a BCS #2, BandCombination_v1xxx_2 does not include an information element addSupportedBandwidthCombinationSet, and an information element addSupportedBandwidthCombinationSet3 in BandCombination_v1xxx_3 indicates that a bandwidth combination set of the intra-band ENDC corresponding to BandCombination3 is a BCS #10. In this case, the information element SupportedBandwidthCombinationSet1 and the information element addSupportedBandwidthCombinationSet1 jointly indicate the bandwidth combination sets of BandCombination1, the information element SupportedBandwidthCombinationSet2 and BandCombination_v1xxx_2 that does not include the information element addSupportedBandwidthCombinationSet jointly indicate the bandwidth combination sets of BandCombination2, and the information element SupportedBandwidthCombinationSet3 and the information element addSupportedBandwidthCombinationSet3 jointly indicate the bandwidth combination sets of BandCombination3.

In the foregoing example, the bandwidth combination sets of BandCombination1 include a first bandwidth combination set of BandCombination1 and a second bandwidth combination set of BandCombination1, where the first bandwidth combination set of BandCombination1 includes the BCS #2, and the second bandwidth combination set of BandCombination1 includes the BCS #3.

In the foregoing example, the bandwidth combination sets of BandCombination2 include a third bandwidth combination set of BandCombination2 and a second bandwidth combination set of BandCombination2, where the third bandwidth combination set of BandCombination2 includes the BCS #5 and the BCS #7, and the second bandwidth combination set of BandCombination2 is empty (where because the information element BandCombination_v1xxx_2 does not include the information element addSupportedBandwidthCombinationSet).

In the foregoing example, the bandwidth combination sets of BandCombination3 include a first bandwidth combination set of BandCombination3 and a second bandwidth combination set of BandCombination3, where the first bandwidth combination set of BandCombination3 includes the BCS #10, and the second bandwidth combination set of BandCombination3 includes the BCS #8.

Based on the second implementation scenario shown in FIG. 3, the UE may report, to the network device by using the first information, all the bandwidth combination sets of the intra-band ENDC corresponding to the n band combinations included in the first-type band combination. The UE may report, to the network device by using the second information, all the bandwidth combination sets of the NRCA corresponding to the n band combinations included in the first-type band combination. In this way, the network device allocates resources to the UE based on all the intra-band ENDC bandwidth combination sets and all the NRCA bandwidth combination sets corresponding to the n band combinations included in the first-type band combination supported by the UE.

Figure 6:
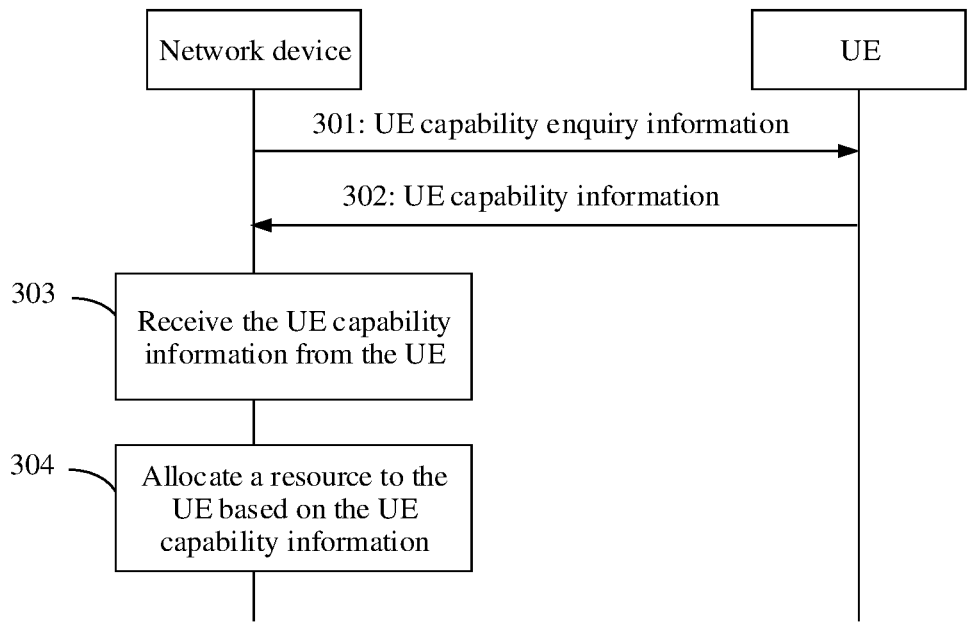
FIG. 6 is a schematic flowchart 2 of a UE capability information reporting method according to an embodiment of this application.

Optionally, in a third implementation scenario of the embodiment shown in FIG. 3, the network device may allocate a resource to the UE based on the UE capability information reported by the UE. As shown in FIG. 6, the method shown in FIG. 3 further includes step 304.

Step 304: The network device allocates a resource to the UE based on the UE capability information.

For example, the first-type band combination supported by the UE includes DC_71A_n71A-n78C, where a bandwidth combination set supported by 71A_n71A is shown in Table 4, and a bandwidth combination set supported by n78C is shown in Table 5.

In Table 4, the BCS #3 includes one carrier, and a channel bandwidth for the carrier may be 50 MHz, 60 MHz, 80 MHz, 90 MHz, or 100 MHz.

TABLE 4

| ENDC configuration | Carrier channel bandwidth (MHz) | Maximum aggregated bandwidth (MHz) | BCS |
|---|---|---|---|
| DC_71A_n71A | 50 | 100 | 3 |
|  | 60 |  |  |
|  | 80 |  |  |
|  | 90 |  |  |
|  | 100 |  |  |

In Table 5, the BCS #5 includes two carriers, and the two carriers may have the following five configurations: In a first configuration, a channel bandwidth for the $1^{st}$ carrier is 60 MHz, 80 MHz, or 100 MHz, and a channel bandwidth for the $2^{nd}$ carrier is 100 MHz. In a second configuration, a channel bandwidth for the $1^{st}$ carrier is 60 MHz, or 80 MHz, and a channel bandwidth for the $2^{nd}$ carrier is 100 MHz. In a third configuration, a channel bandwidth for the $1^{st}$ carrier is 80 MHz, 90 MHz, or 100 MHz, and a channel bandwidth for the $2^{nd}$ carrier is 100 MHz. In a fourth configuration, a channel bandwidth for the $1^{st}$ carrier is 100 MHz, and a channel bandwidth for the $2^{nd}$ carrier is 100 MHz. In a fifth configuration, a channel bandwidth for the $1^{st}$ carrier is 100 MHz, and a channel bandwidth for the $2^{nd}$ carrier is 100 MHz.

TABLE 5

| NRCA configuration | Carrier channel bandwidth (MHz) | Carrier channel bandwidth (MHz) | Maximum aggregated bandwidth (MHz) | BCS |
|---|---|---|---|---|
| CA_n77C | 60, 80, 100 | 100 | 200 | 5 |
| CA_n78C | 60, 80 | 100 |  |  |
| CA_n79C | 80, 90, 100 | 100 |  |  |
|  | 100 | 100 |  |  |
|  | 100 | 100 |  |  |

Therefore, the network device may allocate the following resources to the UE in the foregoing example: allocating a carrier whose channel bandwidth is 80 MHz to a band combination 71A_n71A in the first-type band combination supported by the UE, and allocating two carriers whose channel bandwidths are 80 MHz and 100 MHz respectively to a band combination 78C in the first-type band combinations supported by the UE.

Based on the third implementation scenario in the embodiment shown in FIG. 3, the network device may allocate resources to the UE based on the bandwidth combination sets of the first-type band combination that is supported by the UE and included in the UE capability information.

The foregoing mainly describes the solutions provided in the embodiments of this application from a perspective of interaction between network elements. It can be understood that the foregoing user equipment, network device, or the like includes a corresponding hardware structure and/or software module for performing each function, to implement the foregoing functions. A person skilled in the art should be easily aware that, in combination with units and algorithm operations of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the user equipment may be divided into function modules based on the foregoing method examples. For example, function modules may be obtained through division based on corresponding functions, or two or more functions may be integrated into one processing module. The integrated module may be implemented in a form of hardware, or may be implemented in a form of a software function module. It should be noted that, in the embodiments of this application, division into the modules is an example, and is merely a logical function division. During actual implementation, another division manner may be used.

Figure 7:
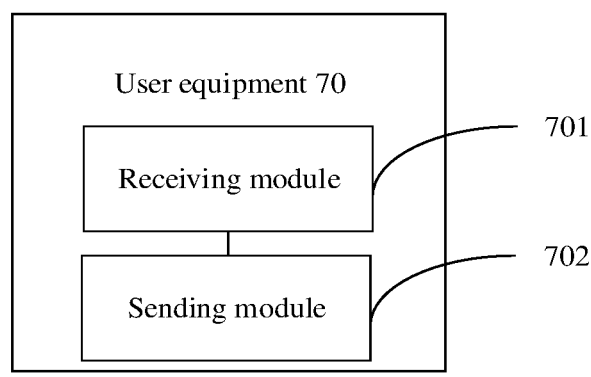
FIG. 7 is a schematic diagram of a structure of user equipment according to an embodiment of this application.

For example, when the function modules are obtained through division in an integrated manner, FIG. 7 is a schematic diagram of a structure of user equipment 70. The user equipment 70 includes a receiving module 701 and a sending module 702.

The receiving module 701 is configured to receive UE capability enquiry information from a network device, where the UE capability enquiry information is used to query a capability of the UE.

The sending module 702 is configured to send UE capability information to the network device based on the UE capability enquiry information, where the UE capability information is used to indicate that the UE supports a first-type band combination, where the first-type band combination includes a band combination including an intra-band evolved universal terrestrial radio access-new radio dual connectivity intra-band ENDC band combination and new radio carrier aggregation NRCA.

The UE capability information includes first information and second information, the first information includes a first bandwidth combination set of the intra-band ENDC supported by the UE, and the second information includes a second bandwidth combination set of the NRCA supported by the UE.

Optionally, the first information further includes the first-type band combination supported by the UE, the first-type band combination includes n band combinations supported by the UE, and the first bandwidth combination set is all bandwidth combination sets of the intra-band ENDC corresponding to the n band combinations; and the second bandwidth combination set is all bandwidth combination sets of the NRCA corresponding to the n band combinations.

Optionally, the second information includes m bits, and the m bits are corresponding to m different bandwidth combination sets. An $i^{th}$ bit in the m bits is used to indicate whether the UE supports a bandwidth combination set corresponding to the $i^{th}$ bit, the bandwidth combination set is predefined, i is an integer greater than or equal to 0 and less than or equal to m, and m is an integer greater than or equal to 1.

Optionally, the first information further includes a band list, and/or an NRCA parameter, and/or an evolved universal terrestrial radio access carrier aggregation EUTRA CA parameter that are/is supported by the UE.

Optionally, the second information further includes the first-type band combination supported by the UE, the first-type band combination includes n band combinations supported by the UE, and the second bandwidth combination set is all bandwidth combination sets of the NRCA corresponding to the n band combinations; and the first bandwidth combination set is all bandwidth combination sets of the intra-band ENDC corresponding to the n band combinations.

Optionally, the first information includes m bits, and the m bits are corresponding to m different bandwidth combination sets. An $i^{th}$ bit in the m bits is used to indicate whether the UE supports a bandwidth combination set corresponding to the $i^{th}$ bit, the bandwidth combination set is predefined, i is an integer greater than or equal to 0 and less than or equal to m, and m is an integer greater than or equal to 1.

Optionally, the second information further includes a band list, and/or an NRCA parameter, and/or an evolved universal terrestrial radio access carrier aggregation EUTRA CA parameter that are/is supported by the UE.

All related content of the operations in the foregoing method embodiment may be cited in function descriptions of the corresponding function modules. Details are not described herein again.

In this embodiment, the user equipment 70 may be presented in a form of the function modules obtained through division in the integrated manner. The "module" herein may be a specific ASIC, a circuit, a processor executing one or more software or firmware programs, a memory, an integrated logic circuit, and/or another component that can provide the foregoing function. In a simple embodiment, a person skilled in the art may figure out that the user equipment 70 may be in a form shown in FIG. 2.

For example, the processor 201 in FIG. 2 may invoke the computer execution instructions stored in the memory 203, to enable the user equipment 70 to perform the UE capability information reporting method in the foregoing method embodiments.

For example, functions/implementation processes of the receiving module 701 and the sending module 702 in FIG. 7 may be implemented by the processor 201 in FIG. 2 by invoking the computer-executable instructions stored in the memory 203. Alternatively, functions/implementation processes of the receiving module 701 and the sending module 702 in FIG. 7 may be implemented by using the communication interface 204 in FIG. 2.

The user equipment 70 provided in this embodiment can perform the UE capability information reporting method. Therefore, for a technical effect that can be achieved by the user equipment 70, refer to the foregoing method embodiments. Details are not described herein again.

In the embodiments of this application, the network device may be divided into function modules based on the foregoing method examples. For example, function modules may be obtained through division based on corresponding functions, or two or more functions may be integrated into one processing module. The integrated module may be implemented in a form of hardware, or may be implemented in a form of a software function module. It should be noted that, in the embodiments of this application, division into the modules is an example, and is merely a logical function division. During actual implementation, another division manner may be used.

Figure 8:
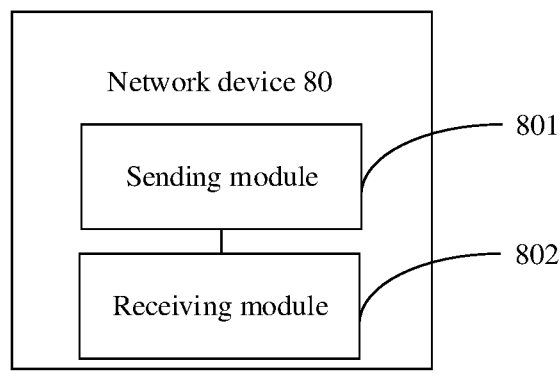
FIG. 8 is a schematic diagram 1 of a structure of a network device according to an embodiment of this application.

For example, when the function modules are obtained through division in an integrated manner, FIG. 8 is a schematic diagram of a structure of a network device 80. The network device 80 includes a sending module 801 and a receiving module 802.

The sending module 801 is configured to send UE capability enquiry information to UE, where the UE capability enquiry information is used to query a capability of the UE.

The receiving module 802 is configured to receive UE capability information from the UE, where the UE capability information is used to indicate that the UE supports a first-type band combination, where the first-type band combination includes a band combination including an intra-band evolved universal terrestrial radio access-new radio dual connectivity intra-band ENDC band combination and new radio carrier aggregation NRCA.

The UE capability information includes first information and second information, the first information includes a first bandwidth combination set of the intra-band ENDC supported by the UE, and the second information includes a second bandwidth combination set of the NRCA supported by the UE.

Optionally, the first information further includes the first-type band combination supported by the UE, the first-type band combination includes n band combinations supported by the UE, and the first bandwidth combination set is all bandwidth combination sets of the intra-band ENDC corresponding to the n band combinations; and the second bandwidth combination set is all bandwidth combination sets of the NRCA corresponding to the n band combinations.

Optionally, the second information includes m bits, and the m bits are corresponding to m different bandwidth combination sets. An $i^{th}$ bit in the m bits is used to indicate whether the UE supports a bandwidth combination set corresponding to the $i^{th}$ bit, the bandwidth combination set is predefined, i is an integer greater than or equal to 0 and less than or equal to m, and m is an integer greater than or equal to 1.

Optionally, the first information further includes a band list, and/or an NRCA parameter, and/or an evolved universal terrestrial radio access carrier aggregation EUTRA CA parameter that are/is supported by the UE.

Optionally, the second information further includes the first-type band combination supported by the UE, the first-type band combination includes n band combinations supported by the UE, and the second bandwidth combination set is all bandwidth combination sets of the NRCA corresponding to the n band combinations; and the first bandwidth combination set is all bandwidth combination sets of the intra-band ENDC corresponding to the n band combinations.

Optionally, the first information includes m bits, and the m bits are corresponding to m different bandwidth combination sets. An $i^{th}$ bit in the m bits is used to indicate whether the UE supports a bandwidth combination set corresponding to the $i^{th}$ bit, the bandwidth combination set is predefined, i is an integer greater than or equal to 0 and less than or equal to m, and m is an integer greater than or equal to 1.

Optionally, the second information further includes a band list, and/or an NRCA parameter, and/or an evolved universal terrestrial radio access carrier aggregation EUTRA CA parameter that are/is supported by the UE.

Figure 9:
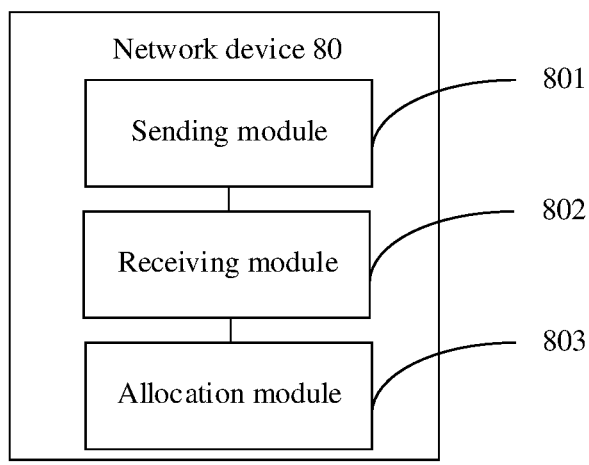
FIG. 9 is a schematic diagram 2 of a structure of a network device according to an embodiment of this application.

Optionally, as shown in FIG. 9, the network device 80 further includes an allocation module 803. The allocation module 803 is configured to allocate a resource to the UE based on the UE capability information.

All related content of the operations in the foregoing method embodiment may be cited in function descriptions of the corresponding function modules. Details are not described herein again.

In this embodiment, the network device 80 may be presented in a form of the function modules obtained through division in the integrated manner. The "module" herein may be a specific ASIC, a circuit, a processor executing one or more software or firmware programs, a memory, an integrated logic circuit, and/or another component that can provide the foregoing function. In a simple embodiment, a person skilled in the art may figure out that the network device 80 may be in a form shown in FIG. 2.

For example, the processor 201 in FIG. 2 may invoke the computer execution instructions stored in the memory 203, to enable the network device 80 to perform the UE capability information reporting method in the foregoing method embodiments.

For example, functions/implementation processes of the sending module 801, the receiving module 802, and the allocation module 803 in FIG. 9 may be implemented by the processor 201 in FIG. 2 by invoking the computer-executable instructions stored in the memory 203. Alternatively, a function/implementation process of the allocation module 803 in FIG. 9 may be implemented by the processor 201 in FIG. 2 by invoking the computer-executable instructions stored in the memory 203, and functions/implementation processes of the sending module 801 and the receiving module 802 in FIG. 9 may be implemented by using the communication interface 204 in FIG. 2.

The network device 80 provided in this embodiment can perform the UE capability information reporting method. Therefore, for a technical effect that can be achieved by the network device 80, refer to the foregoing method embodiments. Details are not described herein again.

Figure 10:
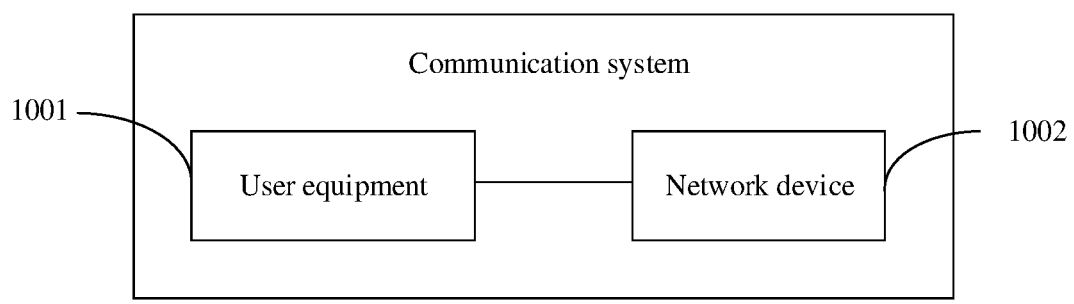
FIG. 10 is a schematic diagram of a structure of a communication system according to an embodiment of this application.

FIG. 10 is a schematic composition diagram of a communication system. As shown in FIG. 10, the communication system may include user equipment 1001 and a network device 1002. It should be noted that FIG. 10 is merely an example of an accompanying drawing. Network elements included in the communication system shown in FIG. 10 and a quantity of the network elements are not limited in this embodiment of this application.

The user equipment 1001 has a function of the user equipment 70 shown in FIG. 7, and may be configured to: receive UE capability enquiry information from the network device 1002, and send UE capability information to the network device 1002 based on the UE capability enquiry information.

The network device 1002 has a function of the network device 80 shown in FIG. 8 or FIG. 9, and may be configured to: send the UE capability enquiry information to the user equipment 1001, and receive the UE capability information from the user equipment 1001.

It should be noted that all related content of the steps in the foregoing method embodiments may be cited in function descriptions of corresponding network elements of the communication system. Details are not described herein again.

The foregoing descriptions of the implementations allow a person skilled in the art to clearly understand that, for the purpose of convenient and brief description, division into only the foregoing function modules is used as an example for description. During actual application, the foregoing functions can be allocated to different function modules for implementation as required. In other words, an inner structure of an apparatus is divided into different function modules to implement all or some of the functions described above.

In the several embodiments provided in this application, it should be understood that the disclosed apparatuses and methods may be implemented in other manners. For example, the foregoing apparatus embodiments are merely examples. For example, division into the modules or units is merely logical function division. There may be another division manner during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. A part or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
receiving, by user equipment (UE), UE capability enquiry information from a network device, wherein the UE capability enquiry information queries a capability of the UE; and
sending, by the UE, UE capability information to the network device based on the UE capability enquiry information, wherein the UE capability information indicates that the UE supports one or more first-type band combinations, wherein each first-type band combination comprises a band combination consisting of an intra-band evolved universal terrestrial radio access-new radio dual connectivity (intra-band ENDC) band combination and a new radio carrier aggregation (NRCA) component;
wherein the UE capability information comprises first information and second information, the first information comprises a first intra-band ENDC bandwidth combination set of the one or more first-type band combinations supported by the UE, and the second information comprises a second NRCA component bandwidth combination set of the one or more first-type band combinations supported by the UE, wherein the second information comprises m bits, and the m bits of the second information correspond to m different bandwidth combination sets; and wherein for each integer value of i from 1 to m, an $i^{th}$ bit in the m bits of the second information indicates whether the UE supports a bandwidth combination set corresponding to the $i^{th}$ bit of the M bits of the second information, the bandwidth combination set corresponding to the $i^{th}$ bit of the M bits of the second information is predefined, and m is an integer greater than or equal to 1.

2. The method according to claim 1, wherein:

the second information further comprises the one or more first-type band combinations supported by the UE, the one or more first-type band combinations comprise n band combinations supported by the UE, and a second bandwidth combination set is all NRCA component bandwidth combination sets corresponding to the n band combinations; and a first bandwidth combination set is all intra-band ENDC bandwidth combination sets corresponding to the n band combinations.

3. The method according to claim 1, wherein the first information comprises m bits, the m bits of the first information correspond to the m different bandwidth combination sets; and wherein for each integer value of i from 1 to m, an $i^{th}$ bit in the m bits of the first information indicates whether the UE supports a bandwidth combination set corresponding to the $i^{th}$ bit in the m bits of the first information, the bandwidth combination set corresponding to the $i^{th}$ bit is predefined, and m is an integer greater than or equal to 1.

4. The method according to claim 3, wherein:

when the $i^{th}$ bit in the m bits of the first information is 0, the $i^{th}$ bit of the m bits in the first information indicates that the UE does not support the bandwidth combination set corresponding to the $i^{th}$ bit of the m bits in the first information; or when the $i^{th}$ bit in the m bits of the first information is 1, the $i^{th}$ bit indicates that the UE supports the bandwidth combination set corresponding to the $i^{th}$ bit of the m bits in the first information.

5. A method, comprising:

sending, by a network device, user equipment (UE) capability enquiry information to UE, wherein the UE capability enquiry information queries a capability of the UE; and receiving, by the network device, UE capability information from the UE, wherein the UE capability information indicates that the UE supports one or more first-type band combinations, wherein each first-type band combination comprises a band combination consisting of an intra-band evolved universal terrestrial radio access-new radio dual connectivity intra-band (ENDC) band combination and a new radio carrier aggregation (NRCA) component; and wherein the UE capability information comprises first information and second information, the first information comprises a first intra-band ENDC bandwidth combination set of the one or more first-type band combinations supported by the UE, and the second information comprises a second NRCA component bandwidth combination set of the one or more first-type band combinations supported by the UE, wherein the second information comprises m bits, the m bits of the second information correspond to m different bandwidth combination sets; and wherein for each integer value of i from 1 to m, an $i^{th}$ bit in the m bits of the second information indicates whether the UE supports a bandwidth combination set corresponding to the $i^{th}$ bit, the bandwidth combination set corresponding to the $i^{th}$ bit of the m bits of the second information is predefined, and m is an integer greater than or equal to 1.

6. The method according to claim 5, wherein:

the second information further comprises the one or more first-type band combinations supported by the UE, the one or more first-type band combinations comprise n band combinations supported by the UE, and a second bandwidth combination set is all NRCA component bandwidth combination sets corresponding to the n band combinations; and a first bandwidth combination set is all intra-band ENDC bandwidth combination sets corresponding to the n band combinations.

7. The method according to claim 5, wherein the first information comprises m bits, the m bits of the first information correspond to the m different bandwidth combination sets; and wherein for each integer value of i from 1 to m, an $i^{th}$ bit in the m bits of the first information indicates whether the UE supports a bandwidth combination set corresponding to the $i^{th}$ bit of the m bits of the first information, the bandwidth combination set corresponding to the $i^{th}$ bit of the m bits of the first information is predefined, and m is an integer greater than or equal to 1.

8. The method according to claim 7, wherein:

when the $i^{th}$ bit in the m bits of the first information is 0, the $i^{th}$ bit indicates that the UE does not support the bandwidth combination set corresponding to the $i^{th}$ bit of the m bits of the first information; or when the $i^{th}$ bit in the m bits of the first information is 1, the $i^{th}$ bit indicates that the UE supports the bandwidth combination set corresponding to the $i^{th}$ bit of the m bits of the first information.

9. A communication apparatus, comprising:

at least one processor; and a non-transitory memory, wherein the non-transitory memory stores program instructions, and when executing the program instructions, the at least one processor executes operations comprising:

receiving user equipment (UE) capability enquiry information from a network device, wherein the UE capability enquiry information queries a capability of the UE; and sending UE capability information to the network device based on the UE capability enquiry information, wherein the UE capability information indicates that the UE supports one or more first-type band combinations, wherein each first-type band combination comprises a band combination consisting of an intra-band evolved universal terrestrial radio access-new radio dual connectivity (intra-band ENDC) band combination and a new radio carrier aggregation (NRCA) component; and wherein the UE capability information comprises first information and second information, the first information comprises a first intra-band ENDC bandwidth combination set of the one or more first-type band combinations supported by the UE, and the second information comprises a second NRCA component bandwidth combination set of the one or more first-type band combinations supported by the UE, wherein the second information comprises m bits, the m bits of the second information correspond to m different bandwidth combination sets; and wherein for each integer value of I from 1 to m, an $i^{th}$ bit in the m bits of the second information indicates whether the UE supports a bandwidth combination set corresponding to the $i^{th}$ bit in the m bits of the second information, the bandwidth combination set corresponding to the $i^{th}$ bit in the m bits of the second information is predefined, and m is an integer greater than or equal to 1.

10. The apparatus according to claim 9, wherein:

the second information further comprises the one or more first-type band combinations supported by the UE, the one or more first-type band combinations comprise n band combinations supported by the UE, and a second bandwidth combination set is all NRCA component bandwidth combination sets corresponding to the n band combinations; and a first bandwidth combination set is all intra-band ENDC bandwidth combination sets corresponding to the n band combinations.

11. The apparatus according to claim 9, wherein the first information comprises m bits, the m bits of the first information correspond to the m different bandwidth combination sets; and wherein for each integer value of i from 1 to m, an $i^{th}$ bit in the m bits of the first information indicates whether the UE supports a bandwidth combination set corresponding to the $i^{th}$ bit of the m bits of the first information, the bandwidth combination set corresponding to the $i^{th}$ bit of the m bits of the first information is predefined, and m is an integer greater than or equal to 1.

12. The apparatus according to claim 11, wherein:

when the $i^{th}$ bit in the m bits of the first information is 0, the $i^{th}$ bit of the m bits of the first information indicates that the UE does not support the bandwidth combination set corresponding to the $i^{th}$ bit; or when the $i^{th}$ bit in the m bits of the first information is 1, the $i^{th}$ bit of the m bits of the first information indicates that the UE supports the bandwidth combination set corresponding to the $i^{th}$ bit of the m bits of the first information.

13. A communication apparatus, comprising:

at least one processor; and a non-transitory memory, wherein the non-transitory memory stores program instructions, and when executing the program instructions, the at least one processor executes operations comprising:

sending user equipment (UE) capability enquiry information to UE, wherein the UE capability enquiry information queries a capability of the UE; and receiving UE capability information from the UE, wherein the UE capability information indicates that the UE supports one or more first-type band combinations, wherein the one or more first-type band combinations comprise a band combination consisting of an intra-band evolved universal terrestrial radio access-new radio dual connectivity intra-band (ENDC) band combination and a new radio carrier aggregation (NRCA) component; and wherein the UE capability information comprises first information and second information, the first information comprises a first intra-band ENDC bandwidth combination set of the one or more first-type band combinations supported by the UE, and the second information comprises a second NRCA component bandwidth combination set of the one or more first-type band combinations supported by the UE, and wherein the second information comprises m bits, the m bits of the second information correspond to m different bandwidth combination sets; and wherein for each integer value of i from 1 to m, an $i^{th}$ bit in the m bits of the second information indicates whether the UE supports a bandwidth combination set corresponding to the $i^{th}$ bit of the m bits of the second information, the bandwidth combination set corresponding to the $i^{th}$ bit of the m bits of the second information is predefined, and m is an integer greater than or equal to 1.

14. The apparatus according to claim 13, wherein:

the second information further comprises the one or more first-type band combinations supported by the UE, the one or more first-type band combinations comprise n band combinations supported by the UE, and a second bandwidth combination set is all NRCA component bandwidth combination sets corresponding to the n band combinations; and a first bandwidth combination set is all intra-band ENDC bandwidth combination sets corresponding to the n band combinations.

15. The apparatus according to claim 13, wherein the first information comprises m bits, the m bits of the first information correspond to the m different bandwidth combination sets; and wherein for each integer value of i from 1 to m, an $i^{th}$ bit in the m bits of the first information indicates whether the UE supports a bandwidth combination set corresponding to the $i^{th}$ bit of the m bits of the first information, the bandwidth combination set corresponding to the $i^{th}$ bit of the m bits of the first information is predefined, and m is an integer greater than or equal to 1.

16. The apparatus according to claim 15, wherein:

when the $i^{th}$ bit in the m bits of the first information is 0, the $i^{th}$ bit of the m bits of the first information indicates that the UE does not support the bandwidth combination set corresponding to the $i^{th}$ bit of the m bits of the first information; or when the $i^{th}$ bit in the m bits of the first information is 1, the $i^{th}$ bit of the m bits of the first information indicates that the UE supports the bandwidth combination set corresponding to the $i^{th}$ bit of the m bits of the first information.

* * * * *